United States Patent
Okada et al.

(10) Patent No.: US 7,688,483 B2
(45) Date of Patent: Mar. 30, 2010

(54) DOCUMENT READING APPARATUS AND METHOD OF CALCULATING POSITION ADJUSTMENT AMOUNT

(75) Inventors: Tomohiko Okada, Kyoto (JP); Yasuhiro Suto, Nara (JP); Shohichi Fukutome, Kyoto (JP); Kenji Tanaka, Kyoto (JP); Mitsuharu Yoshimoto, Nara (JP); Hisashi Yamanaka, Nara (JP); Kenji Nakanishi, Nara (JP); Noritomo Nakashima, Nara (JP); Yoshikazu Fukuda, Nara (JP); Hiroshi Sudoh, Nara (JP); Yutaka Fukuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 459 days.

(21) Appl. No.: 11/829,158

(22) Filed: Jul. 27, 2007

(65) Prior Publication Data

US 2008/0024839 A1 Jan. 31, 2008

(30) Foreign Application Priority Data

Jul. 31, 2006 (JP) ............................. 2006-208467
Feb. 20, 2007 (JP) ............................. 2007-039583

(51) Int. Cl.
*H04N 1/04* (2006.01)

(52) U.S. Cl. ....................... 358/497; 358/486; 358/406; 358/474; 358/463

(58) Field of Classification Search ................. 358/486, 358/488, 497, 494, 474, 505, 463, 465, 466, 358/406, 504; 382/275, 318, 319; 399/212, 399/211; 250/234–236, 216, 239
See application file for complete search history.

(56) References Cited

U.S. PATENT DOCUMENTS 5,930,008 A * 7/1999 Nabeshima et al. ......... 358/496

(Continued)

FOREIGN PATENT DOCUMENTS

JP 08-095167 4/1996

(Continued)

*Primary Examiner*—Cheukfan Lee
(74) *Attorney, Agent, or Firm*—Renner, Otto, Boisselle & Sklar LLP

(57) ABSTRACT

A document reading apparatus including: a first scanning section that moves in a scanning direction along a document surface, for supporting a first mirror to reflect an image of a document in a direction parallel to the scanning direction; an intermediate scanning section that moves synchronous with the first scanning section, for supporting an intermediate mirror to reflect the image of the document reflected by the first mirror in a direction opposite from an incident direction of the image; a reading section including an imaging sensor for reading the image of a scanned document and a focusing lens for focusing the image of the document reflected by the intermediate mirror on the imaging sensor; a driving wire for pulling the first scanning section in the scanning direction; a supporting pulley for supporting the driving wire at a starting side for scanning or at an ending side for scanning; a position adjustment section capable of adjusting a position of the supporting pulley in its axial direction; a control section for performing such control that the image for adjustment is read by the reading section when the first scanning section is located at a first position and at a second position in the scanning direction, and an adjustment amount of the position adjustment section is calculated based on a readout result of the image; and an output section for outputting the calculated adjustment amount.

19 Claims, 30 Drawing Sheets

U.S. PATENT DOCUMENTS

| | | | |
|---|---|---|---|
| 6,563,938 B1 * | 5/2003 | Harada | 382/108 |
| 6,600,579 B1 * | 7/2003 | Kumagai et al. | 358/474 |
| 7,212,320 B2 * | 5/2007 | Imoto | 358/497 |
| 7,616,351 B2 * | 11/2009 | Higashitani | 358/461 |
| 7,630,102 B2 * | 12/2009 | Kurokawa | 358/474 |
| 2002/0159100 A1 * | 10/2002 | Okutomi et al. | 358/497 |
| 2005/0179954 A1 * | 8/2005 | Arai et al. | 358/3.26 |

FOREIGN PATENT DOCUMENTS

| | | |
|---|---|---|
| JP | 2001-144897 | 5/2001 |

* cited by examiner

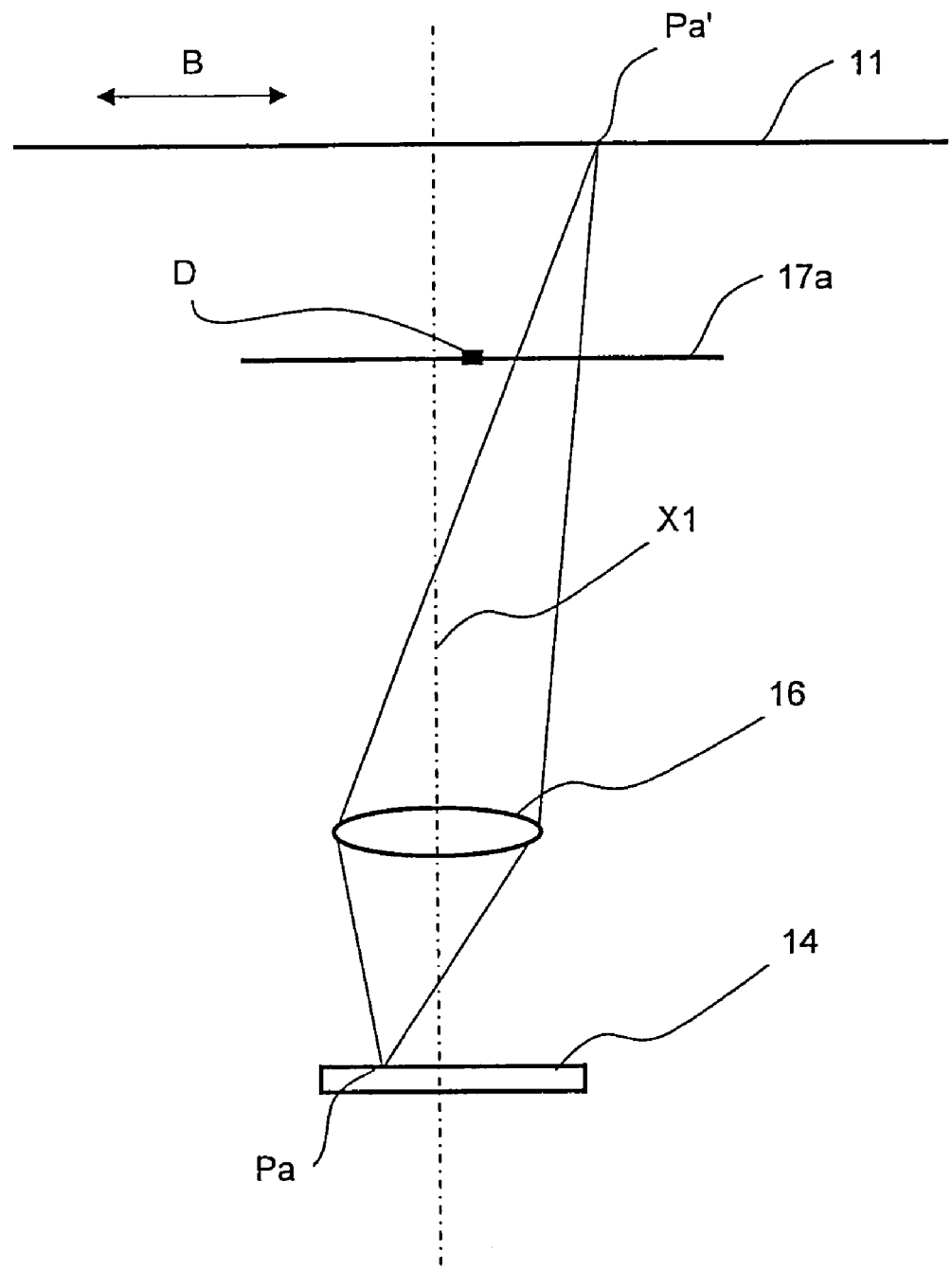

Fig.29
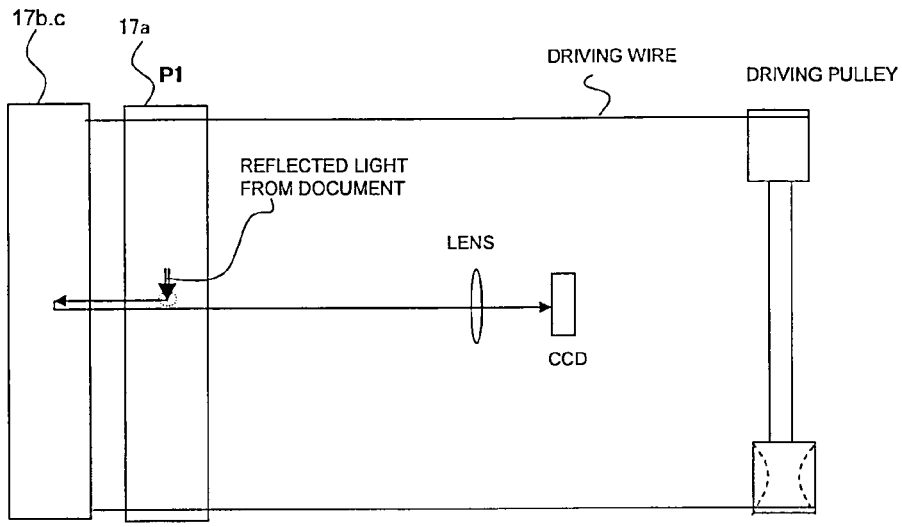
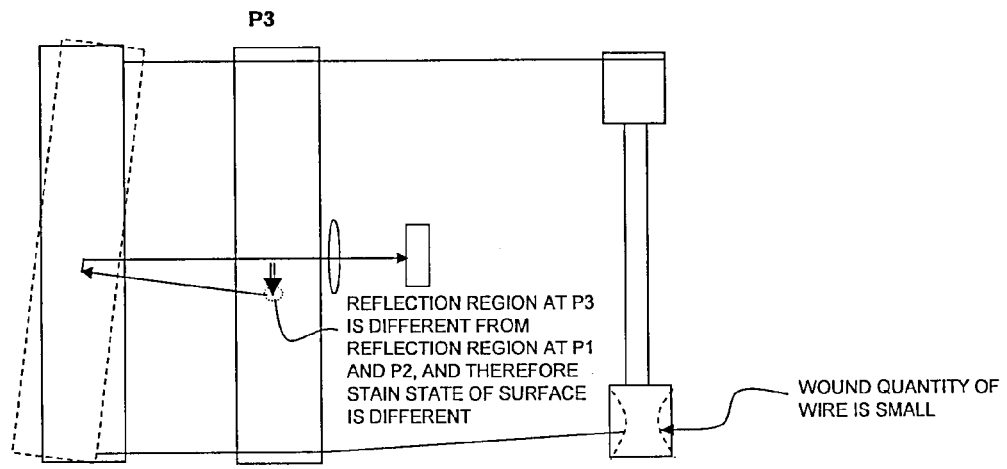
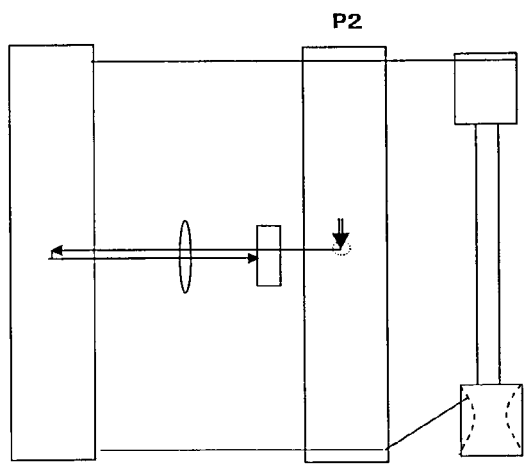

DOCUMENT READING APPARATUS AND METHOD OF CALCULATING POSITION ADJUSTMENT AMOUNT

CROSS-REFERENCE TO RELATED APPLICATION

This application is related to Japanese patent application Nos. 2006-208467 and 2007-39583 which are filed on Jul. 31, 2006 and Feb. 20, 2007 respectively whose priorities are claimed under 35 USC §119, the disclosure of which are incorporated by reference in its entirety.

BACKGROUND OF THE INVENTION

1. Field of the Invention

The present invention relates to a document reading apparatus and a method of calculating a position adjustment amount thereof.

2. Description of the Related Art

A document reading apparatus is known, wherein a document placed on an original platen is scanned and an image of the document is read through a minification optical system. The document reading apparatus has a scanning section for scanning the document. This scanning section has a light source for illuminating the document, and a reflection mirror for reflecting light reflected from a surface of the document to guide it to an imaging sensor. By this document reading apparatus, the light reflected by the reflection mirror is focused on the imaging sensor via a focusing lens.

Usually, the scanning section is constituted of independent two units. A first unit has the light source and one reflection mirror (first mirror). The first unit moves in one direction (in a sub-scanning direction) along the original platen. The light source illuminates the document and the first mirror reflects light reflected from the document in a moving direction of the unit. Therefore, the first mirror is supported at an angle of 45 degrees with respect to the document surface. A second unit has two reflection mirrors (second mirror and third mirror), with each reflective surface arranged at an angle of 90 degrees to each other, whereby the light reflected from the first mirror is reflected below an incident light and in a direction opposite from an incident direction of the incident light. The second unit moves in the same direction as the first unit, whereby the light reflected in the sub-scanning direction by the first unit is reflected in an angular transversal U-shape. The light reflected by the second unit forms an image of the document on the imaging sensor through the focusing lens, with the optical axis along the aforementioned moving direction.

The imaging sensor and the focusing lens do not move with respect to the document during document scanning. The second unit moves at half the speed with respect to the first unit. Each unit is pulled and driven by a driving wire directly fixed to each of the units or hung on the unit through a pulley. By designing an extending manner of this driving wire, the ratio of a moving speed between the first unit and the second unit is maintained to ½. Accordingly, an optical path length from a reading position of the document to the imaging sensor is maintained constant, irrespective of a position of the scanning section. The first to third mirrors and the focusing lens constitute the aforementioned minification optical system.

As the imaging sensor, a linear image sensor for reading the image in one direction (main scanning direction) as a plurality of pixels is used. The imaging sensor is attached so as to read the image of the document in a width direction orthogonal to the sub-scanning direction, namely in a length direction of the original platen.

The focusing lens is adjusted and fixed, so that its optical axis is parallel to the length direction of the original platen. This is because the position in the width direction is not allowed to be deviated, when the scanning section is positioned at a tip end portion of the document and at a rear end portion of the document. Namely, the position, where both edges in the width direction of a rectangular document are read, is adjusted so as to be constant wherever the scanning section may move. More specifically, the direction of the optical axis is adjusted in such a way that when the vicinity of the tip end of the rectangular document is read, 100 numbered pixel and 5140 numbered pixel of the image sensor are at the positions of both edges, and when the vicinity of the rear end of the document is read, 100 numbered pixel and 5140 numbered pixel of the image sensor are also at the positions of both edges.

Meanwhile, reading of the document has not been considered to be influenced by a deviation of the scanning section in the width direction. As described above, the scanning section has the light source and the reflection mirror. There is almost no change in light distribution in the width direction of the light source, namely in the main-scanning direction, with respect to a minute deviation of about several pixels. In addition, even when the reflection mirror deviates in the width direction, the optical path length is unchanged. However, when the reflective angle changes by a twist, or the reflection mirror is displaced due to vibration in a direction other than the width direction, the reading of the document is adversely influenced thereby. For example, when there is a distortion in attachment or driving of the driving wire, thereby a stress in the width direction is accumulated, the twist and the vibration are thereby caused. Therefore, a known document reading apparatus is constituted in such a way that a play is provided in a rotation axis direction of the pulley on which the driving wire is hung, to allow the pulley to move freely in the width direction (for example, see Japanese Laid-Open Patent Publication No. 08-95167).

Conventionally, it is so considered that even when the scanning section is deviated in the width direction, an image quality is not influenced thereby. However, it is found that conditions differ when a dust corresponding to a pixel width or larger than the pixel width is adhered to the first mirror.

The first mirror is located at a position close to the document in the optical path of the minification optical system. Even if this position is off the depth of focus of the focusing lens, the dust adhered to the first mirror is read as a blurred image. When shading correction is performed, with such a dust adhered to the first mirror, a reading sensitivity of each pixel of the image sensor is adjusted so that a read result of the reference white board including the blurred image of the dust is uniform. Namely, the pixel with the image of the dust is adjusted to a higher sensitivity than an original state, based on the read result which is darker than the original reference white board. Here, the reference white board serves as an image for adjustment for correcting variation of sensitivity of each pixel of the imaging sensor and of light distribution of the light source. The reference white board is provided in the vicinity of the tip end portion or rear end portion of the original platen.

When the moving direction of the scanning section is coincident with the optical axis of the focusing lens, the pixel for reading the image of the dust is unchanged, whichever position in the sub-scanning direction the scanning section is located. A higher sensitivity is set for this pixel based on the shading correction, and therefore the influence of the dust is corrected. However, when the moving direction of the scanning section is deviated from the optical axis of the focusing lens, the pixel for reading the image of the dust is deviated to the adjacent pixel as the scanning section gets away from the reference white board. When this deviation quantity exceeds the width of one pixel, a streak of light and darkness appears in the read image.

As a method of preventing such a malfunction, adhesion of the dust to the first mirror is eliminated. However, a technique to completely shield the inside of the image reading apparatus is not a practical way in terms of cost. Even if the first mirror is cleaned regularly, it cannot help being affected by the dust adhered thereto before next cleaning.

As another method, the sub-scanning direction, namely, the moving direction of the scanning section, is made coincident with the direction of the optical axis of the focusing lens. In the conventional document reading apparatus, a particular mechanism therefor is not provided.

SUMMARY OF THE INVENTION

In view of the above-described circumstances, the present invention provides a mechanism for aligning the moving direction of the first mirror with the direction of the optical axis of the focusing lens, to reduce the influence of the dust adhered to the first mirror of the minification optical system, on the read image.

The present invention provides a document reading apparatus including: a first scanning section that moves in a scanning direction along a document surface, for supporting a first mirror to reflect an image of a document in a direction parallel to the scanning direction; an intermediate scanning section that moves synchronous with the first scanning section, for supporting an intermediate mirror to reflect the image of the document reflected by the first mirror in a direction opposite from an incident direction of the image; a reading section including an imaging sensor for reading the image of a scanned document and a focusing lens for focusing the image of the document reflected by the intermediate mirror on the imaging sensor; a driving wire for pulling the first scanning section in the scanning direction; a supporting pulley for supporting the driving wire at a starting side for scanning or at an ending side for scanning; a position adjustment section capable of adjusting a position of the supporting pulley in its axial direction; a control section for performing such control that the image for adjustment is read by the reading section when the first scanning section is located at a first position and at a second position in the scanning direction, and an adjustment amount of the position adjustment section is calculated based on a readout result of the image; and an output section for outputting the calculated adjustment amount.

From a different viewpoint, the present invention provides method of calculating a position adjustment amount of a position adjustment part in a document reading apparatus including: a first scanning section that moves in a scanning direction along a document surface, for supporting a first mirror to reflect an image of a document in a direction parallel to a scanning direction; an intermediate scanning section that moves synchronous with the first scanning section, for supporting an intermediate mirror to reflect the image of the document reflected by the first mirror in a direction opposite from an incident direction of the image; a reading section including an imaging sensor for reading the image of a scanned document and a focusing lens for focusing the image of the document reflected by the intermediate mirror on the imaging sensor; a driving wire for pulling the first scanning section in the scanning direction; a supporting pulley for supporting the driving wire at a starting side for scanning or at an ending side for scanning; and a position adjustment section capable of adjusting a position of the supporting pulley in its axial direction, the method including the steps of: moving the first scanning section to a first position and reading an image for adjustment by the reading section; moving the first scanning section to a second position from the first position and reading the image by the reading section; and calculating the adjustment amount of the position adjustment section based on a readout result of an image for adjustment read at the first position and the second position, wherein each step is executed by a computer.

The document reading apparatus according to the present invention includes one or more position adjustment parts for adjusting the document scanning section to move in parallel to a reference direction, by adjusting the position of each supporting pulley in an axial direction of the supporting pulley. Therefore, the moving direction of the first mirror can be aligned with the direction of the optical axis of the focusing lens. Accordingly, the influence of the dust adhered to the first mirror on the read image can be reduced. Further, the document reading apparatus according to the present invention includes the control section for controlling the reading section to read the image for adjustment when the first scanning section is located at the first position and the second position in the scanning direction and calculate the adjustment amount of the position adjustment part based on the read position of the image, and the output section for outputting the calculated adjustment amount. Therefore, based on the outputted adjustment amount, an accurate and quick adjustment is enabled.

In addition, according to the method of calculating the position adjustment amount of the supporting pulley of the present invention, the position adjustment amount of the supporting pulley is calculated based on the difference in the positions of the image read by the imaging sensor at the starting portion for scanning and the ending portion for scanning respectively, in the direction orthogonal to the reference direction. Therefore, an accurate adjustment amount can be obtained.

BRIEF DESCRIPTION OF THE DRAWINGS

FIG. 8 is an explanatory view individually showing the optical path for each Pa-numbered pixel of FIG. 7;

FIG. 29 is an explanatory view showing a deviation quantity occurring between a scanning end-edge and a scanning start-edge.

DETAILED DESCRIPTION OF THE PREFERRED EMBODIMENTS

Figure 1:
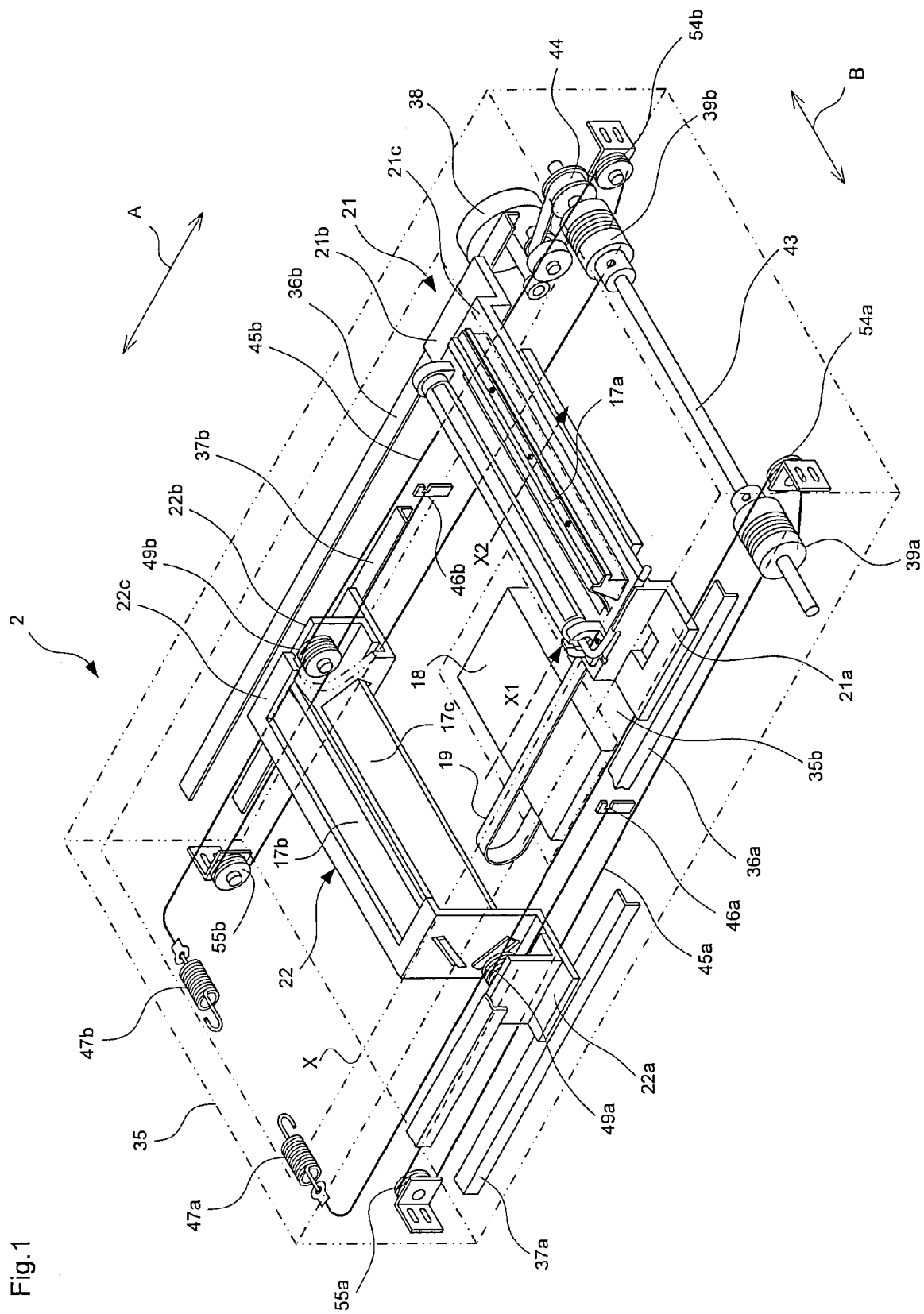
FIG. 1 is a perspective view showing a specific shape of a mechanical part of a document reading section for scanning and reading a document by a document reading apparatus according to the present invention.

Preferred embodiments of the present invention will be described hereinafter.

The aforementioned control section may control the document reading apparatus according to the present invention to obtain a deviation quantity in an axial direction of a supporting pulley of an image for adjustment read at a first position and a second position, and calculate the adjustment amount to minimize the deviation quantity. Thus, an accurate adjustment can be made.

Also, a plurality of driving wires are provided, and the document scanning section may have a wire fixing part for attaching, to both ends in the direction orthogonal to the reference direction, the driving wires corresponding respectively thereto.

Further, the document scanning section is composed of a first scanning section for supporting the first mirror that reflects the image of the document in the reference direction, and an intermediate scanning section for supporting an intermediate mirror that reflects the image of the document reflected by the first mirror in a further different direction, wherein the reading section may include the imaging sensor for reading the image of the document reflected by the first mirror and the intermediate mirror, and the focusing lens, with the optical axis thereof fixed in the reference direction, for focusing the image of the document reflected by the intermediate mirror on the imaging sensor.

The reference direction is the optical axis direction of the focusing lens, and the position adjustment part may function to adjust at least the moving direction of the first scanning section to the optical axis direction of the focusing lens, namely, the reference direction.

In addition, the position adjustment part may include a shaft member to be rotary-operated by an operator and a conversion mechanism for converting the rotation of the shaft member into a reference directional linear movement of the supporting pulley. Thus, by suitably setting a linear moving amount of the supporting pulley with respect to the rotation angle of the shaft member, a highly accurate adjustment is enabled.

Further, the document reading apparatus may further include a frame member disposed outside the position adjustment part, and the frame member may have a notch part that allows the operator to rotary-operate the shaft member from outside. Thus, the operator can easily operate the shaft member, thus facilitating the adjustment.

In addition, the document reading apparatus may further include a driving pulley on which the driving wire is hung, so that the scanning section is pulled via the driving wire in association with turning of the driving pulley, and the supporting pulley supports the driving wire in a route of the driving wire from the driving pulley to the first scanning section.

Further, the document reading apparatus may include a control section for controlling a reading section to read an image for adjustment at a first position and a second position in a moving region of the first scanning section, calculating, as a deviation quantity, a difference in the positions of the image read at the first position and the second position respectively, in the direction orthogonal to the reference direction, and calculating a position adjustment amount of the supporting pulley based on the deviation quantity; and a display section for displaying the adjustment amount of the position adjustment part based on the calculated deviation quantity, wherein the imaging sensor may read the image of the document in the direction orthogonal to the reference direction.

The deviation quantity may include a deviation that occurs when the optical path of a center portion of the image guided to the focusing lens by the first mirror and/or the intermediate mirror obliquely intersect with the optical axis of the focusing lens. Here, the center portion of the image refers to the image of a part projected on the pixel on the optical axis of the focusing lens. The optical path connecting the center portion of the image and the pixel on the imaging sensor is parallel to the optical axis, in an ideal state, namely, in a state where the first mirror and the intermediate mirror intersect with the optical axis at right angles in a plane parallel to the document, and are disposed so as to incline at an angle of 45 degrees relative to the plane to reflect the optical path in the direction perpendicular to the plane. However, when there is an inclination in the arrangement of the first mirror and/or the intermediate mirror from an ideal state, the optical path obliquely intersects with the optical axis. When the inclination changes at each position in the moving region, this change of inclination appears as the deviation.

In addition, the image for adjustment may be placed on the first mirror. Alternately, the image for adjustment may be placed on the first scanning section and the image may be supported at a position at a distance equal to the distance from the first scanning section of the document to be read.

The aforementioned first position of the document reading apparatus may be at the starting portion of a scanning region where the first scanning section moves for reading the document. For example, the first position may be at a starting portion of scanning region of an original platen surface on which the document is placed. Alternately, the first position may be the position at which a reference read region for adjustment is arranged. A reflection part of a reference concentration used in shading correction is given as an example of the reference read region. Usually, a white reference board is disposed. Alternately, the first position may be located in the region sandwiched between the position at an equal distance from both of the scan starting portion and the scan ending portion of the moving region, and the scan starting portion of the moving region.

Further, the second position may be located in the scan ending portion of the scanning region where the first scanning section moves for reading the document. For example, the second position may be located at an ending portion for scanning of the original platen surface on which the document is placed. Alternately, the second position may be a scanning end-edge position relative to the document of a maximum length. Further alternately, the second position may be located in the region sandwiched between a third position at the equal distance from both of the scan starting portion and the scan ending portion of the moving region, and the scan ending portion. In the aforementioned region, the second position may be at a center part between the third position and the ending portion for scanning.

Also, in the method of calculating the position adjustment amount of the supporting pulley of the present invention, the first position may be located in the starting portion of the scanning region where the first scanning section moves for reading the document. For example, the first position may be the position at the starting side for scanning of the original platen surface on which the document is placed. Alternately, the first position may be the position at which the reference read region for adjustment is arranged. A reflection part of the reference concentration used in the shading correction is given as an example of the reference read region. Usually, the white reference board is disposed. Alternately, the first position may be located in the region sandwiched between the position at the equal distance from both of the scan starting portion and the scan ending portion of the moving region, and the scan starting portion.

Further the second position may be located in the scan ending portion of the scanning region where the first scanning section moves for reading the document. For example, the second position may be the position at the ending side for scanning of the original platen surface on which the document is placed. Alternately, the second position may be the scanning end-edge position relative to the document of the maximum length. Alternately, the second position may be located in the region sandwiched between the third position at the equal distance from both of the scan starting portion and the scan ending portion of the moving region, and the scan ending portion. In the aforementioned region, the second position may be located in the center portion between the third position and the scan ending portion.

In the method of calculating the position adjustment amount of the supporting pulley of the present invention, the image for adjustment may be placed on the first mirror.

Alternately, the image for adjustment is placed on the first scanning section, and the image may be supported at a position at an equal distance from the first scanning section of the document to be read.

A plurality of various preferred embodiments shown here can also be combined.

The present invention will be described in detail hereinafter with reference to the drawings. The present invention can be fully understood by the description given below. It should be noted that the description given below is only exemplification in all aspects, and should not be restrictive.

Structure of a Document Reading Section—a First Scanning Section, an Intermediate Scanning Section, a Reading Section, a Driving Wire, and a Supporting Pulley FIG. 1 is a perspective view showing a specific shape of a mechanical part of a document reading section for scanning and reading a document, in a document reading apparatus according to the present invention. Note that an entire structure of the document reading apparatus and a function performed by the document reading section in this structure will be described later in detail with reference to FIGS. 2 and 3. As shown in FIG. 1, a flat plate-shaped bottom plate 35b is attached to a bottom part of a frame 35 to be an external frame of a document reading section 2. A focusing lens 16 and an imaging sensor 14 not shown in FIG. 1 are attached to a part covered by a dark box 18 on the bottom plate 35b. An arrow X1 shown by a dashed-dotted line over the dark box 18 shows a direction of an optical axis of the focusing lens 16 attached to the frame 35. For example, a steel sheet plated with zinc on its surface is used for the frame 35 and the bottom plate 35b. In addition, a first scanning unit 21 and a second scanning unit 22 are attached so as to move in a direction along the bottom plate 33. The first scanning unit 21 is the first scanning section in the claims. The second scanning unit 22 is the intermediate scanning section in the claims.

The first scanning unit 21 has wire fixing parts 21a and 21b on both ends, and has a mirror supporting part 21c for supporting a light source lamp 13 and a first mirror 17a between both the ends. A driving wire 45a is fixed to the wire fixing part 21a, and a driving wire 45b is fixed to the wire fixing part 21b. Moreover, both the ends of the first scanning unit 21 are respectively supported by guide rails 36a and 36b to move on the guide rails 36a and 36b. An arrow X2 shown by a dashed-dotted line at the center of the first scanning unit 21 shows a moving direction of the first scanning unit 21. A moving direction X2 is determined by a direction in which the driving wires 45a and 45b fixed to both the ends of the first scanning unit 21 are hung on supporting pulleys 54a and 55a on both ends.

The second scanning unit 22 has wire fixing parts 22a and 22b on both ends, and has a mirror supporting part 22c for supporting a second mirror 17b and a third mirror 17c between both the ends. The second mirror 17b and the third mirror 17c are intermediate mirrors in the claims. A pulley 49a is attached to the wire fixing part 22a, and the wire 45a is hung on the pulley 49a. A pulley 49b is attached to the wire fixing part 22b, and the driving wire 45b is hung on the pulley 49b. In addition, both the ends of the second scanning unit 22 are respectively supported by guide rails 37a and 37b to move on the guide rails 37a and 37b. The second scanning unit 22 moves in the same direction as the first scanning unit 21.

A drive motor 38 is a stepping motor for driving the first scanning unit 21 and the second scanning unit 22, and the rotation is controlled by a motor control circuit not shown. The rotation of an output shaft of the drive motor 38 is transferred to a driving shaft 43 through a timing belt 44, to rotate driving pulleys 39a and 39b attached to both ends of the driving shaft 43. The driving wires 45a and 45b are wound on the driving pulleys 39a and 39b, respectively, and further the driving wires 45a and 45b are fixed to the first scanning unit 21 and the second scanning unit 22, respectively. The rotation of the driving pulleys 39a and 39b is converted into a linear movement by the driving wires 45a and 45b, to move the first scanning unit 21 and the second scanning unit 22 in a sub-scanning direction A. The driving shaft 43, and the driving pulleys 39a and 39b are made of steel, and a steel wire is used for the driving wires 45a and 45b.

Figure 4:
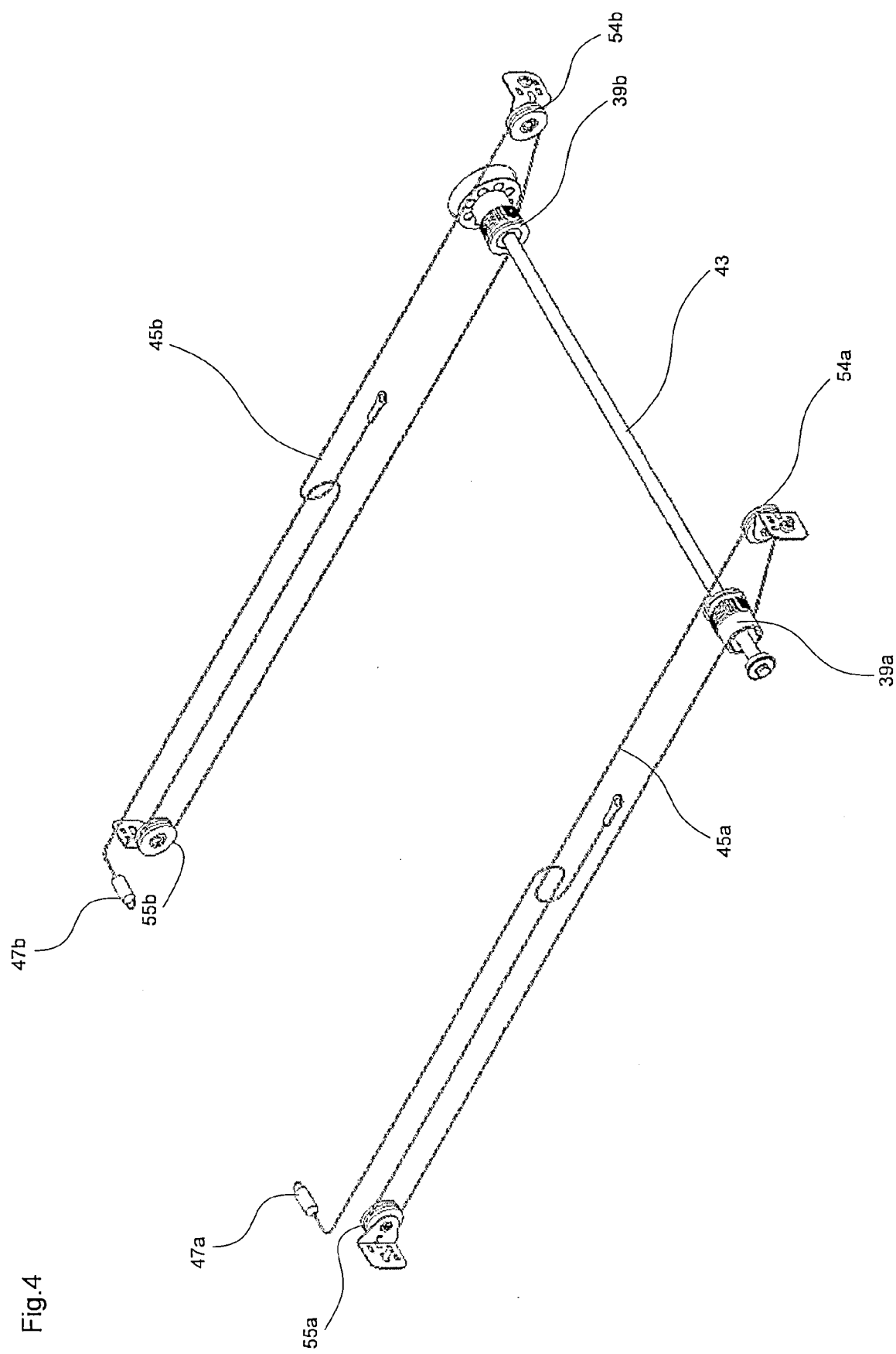
FIG. 4 is a perspective view showing driving wires, supporting pulleys, and driving pulleys, by extracting them from FIG. 1.
Figure 5:
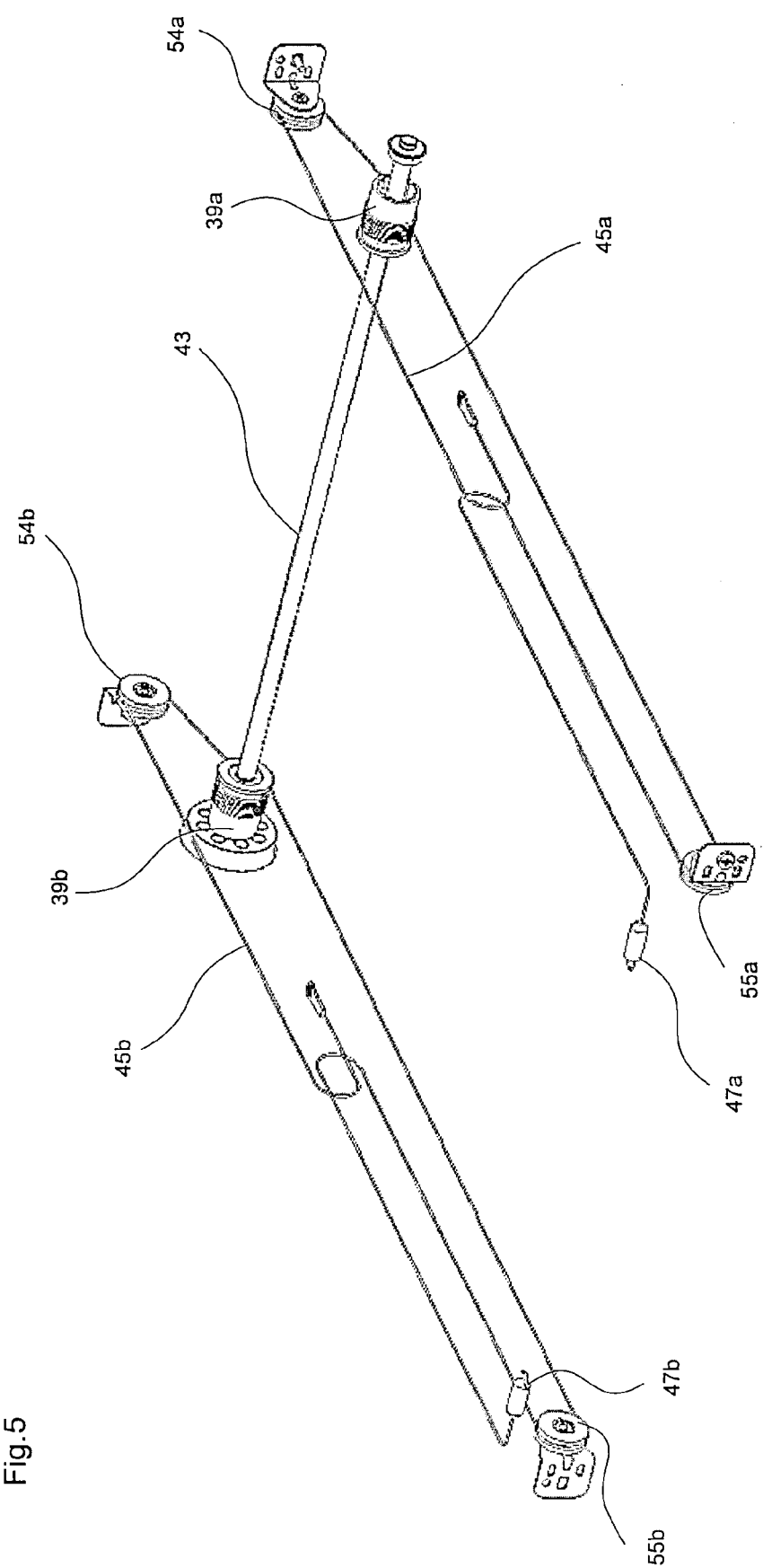
FIG. 5 is a perspective view when viewed from a direction different from that of FIG. 4, showing the driving wires, the supporting pulleys, and driving pulleys, by extracting them from FIG. 1.

A Manner of Hanging the Driving Wire for Pulling the First Scanning Section and the Intermediate Scanning Section FIGS. 4 and 5 are perspective views showing the driving wires 45a, 45b, supporting pulleys 54a, 54b, 55a, 55b, and driving pulleys 39a, 39b, by extracting them from FIG. 1. FIG. 4 is viewed from the ending side for scanning, and FIG. 5 is viewed from the starting side for scanning. Referring to FIGS. 4 and 5, an extending manner of the driving wires 45a and 45b can be easily grasped. A manner of hanging the driving wires 45a and 45b will be described with reference to FIGS. 1, 4, and 5.

One end of the driving wire 45a is fixed to a hook 46a. The wire 45a is then hung on the pulley 49a of the second scanning unit 22, and is further fixed to the wire fixing part 21a of the first scanning unit 21 at the ending side for scanning (P2 side of FIG. 2) from the pulley 49a. The pulley 49a works as a moving pulley, and therefore the second scanning unit moves at a speed of ½ of the first scanning unit. The portion of the driving wire 45a farther from a part fixed to the first scanning unit 21 is hung on the supporting pulley 54a. The wire 45a is further hung and wound around the driving pulley 39a, and further hung on the supporting pulley 55a disposed at the scanning start end-edge side (P1 side in FIG. 2). Further, the wire 45a is hung on the pulley 49a of the second scanning unit 22. The ending portion for scanning, being the further tip portion, is fixed to the frame 35 via a tension spring 47a. Note that a pulley not shown is provided at a part where the driving wire 45a is bent at approximately a right angle just before reaching the tension spring 47a. By this pulley, a direction of tension of the driving wire 45a is changed to a direction of the tension spring 47a hung on the frame.

When the driving pulley 39a is rotated clockwise in FIG. 1, the driving wire 45a on the hook 46a side is wound. Thus, the first scanning unit 21 and the second scanning unit 22 move from the starting side for scanning to the ending side for scanning. In association of the rotation of the driving pulley 39a, the driving wire 45a on the tension spring 47a side is sagged. However, the pulley 49a moves to the ending side for scanning to stretch a sagging portion in a transversal U-shape. When the driving pulley 39a is rotated reversely (counter-clockwise), the driving wire on the tension spring 47a side is wound, and a U-shaped portion hung on the pulley 49a is wound and the second scanning unit 22 moves from the ending side for scanning to the starting side for scanning. The first scanning unit 21 also moves accordingly.

Although the above description is given on the driving wire 45a, the same thing can be the for the driving wire 45b, wherein one end thereof is fixed to the hook 46b, and its tip reaches the tension spring 47b through the pulley 49b, the wire fixing part 21b, the supporting pulley 54b, the driving pulley 39b, the supporting pulley 55b, and the pulley 49b, and is fixed to the frame 35 via the tension spring 47b.

Mechanism of Position Adjustment Part—Position Adjustment in an Axial Direction of the Supporting Pulley A document reading section 2 in this embodiment has a mechanism that the supporting pulleys 54a, 54b, 55a, 55b can adjust the position in the main-scanning direction (direction shown by arrow B in FIG. 1), respectively. FIG. 6 is an explanatory view showing details of the position adjustment mechanism of the supporting pulley 54b according to the present invention. The position adjustment mechanism corresponds to the position adjustment part in the claims.

Figure 6A:
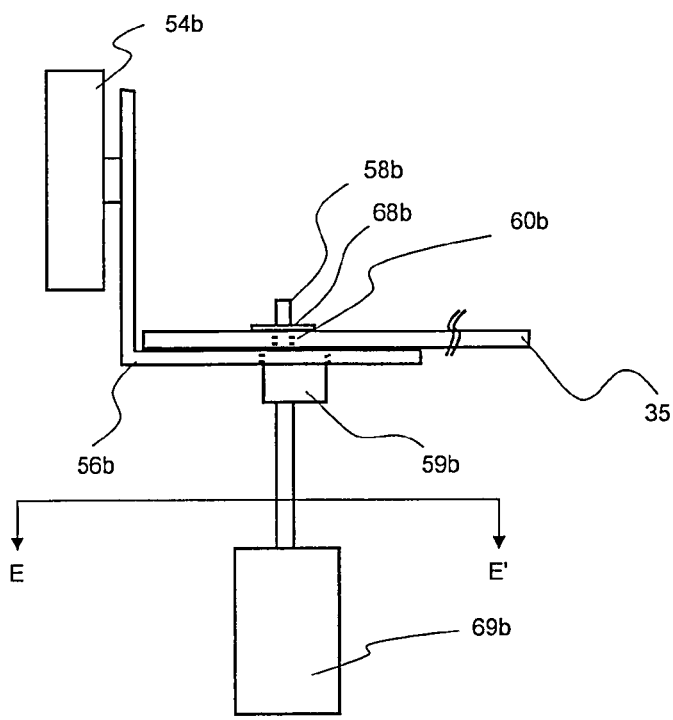
FIG. 6 is an explanatory view showing details of a position adjustment mechanism of the supporting pulley according to the present invention.

FIG. 6A is an explanatory view showing a state in which the supporting pulley 54b is attached to the frame 35 via the pulley support plate 56b when viewed from above. As shown in FIG. 6A, the pulley support plate 56b is an L-shaped sheet of metal, and is attached to an end portion of the frame 35. Laterally long oblong hole parts 63b and 64b are provided at a part contacting the frame of the pulley support plate 56b, and a rectangular opening part 65b is provided between them. At the frame 35 side, two guide pins 61b and 62b are provided so as to fit into the oblong hole part 63b in the state where the pulley support plate 56b is attached thereto. In addition, a screw hole for passing an attachment screw 66b through the oblong hole part 64b is provided. Further, an eccentric cam shaft bearing 60b is provided in the frame 35. An eccentric cam shaft 58b integrally formed with an eccentric cam 59b is turnably fitted into the eccentric cam shaft bearing 60b. The eccentric cam 59b functions to regulate an attachment position to the frame 35 of the pulley support plate 56b by making a fringe face abut on the fringe of the opening part 65b. One end portion of the eccentric cam shaft 58b is inserted into the eccentric cam shaft bearing 60b, and is fixed thereto so that the eccentric cam shaft bearing 60b is sandwiched between the eccentric cam 59b and an E-ring 68b. A grip 69b for rotating the eccentric cam shaft 58b is provided on the other end side of the eccentric cam shaft 58b. Preferably, the eccentric cam shaft 58b is fitted into the eccentric cam shaft bearing 60b with a frictional force to the extent of allowing the eccentric cam shaft 58b to move when the operator rotates the grip part 69b with a certain degree of strength.

Figure 6B:
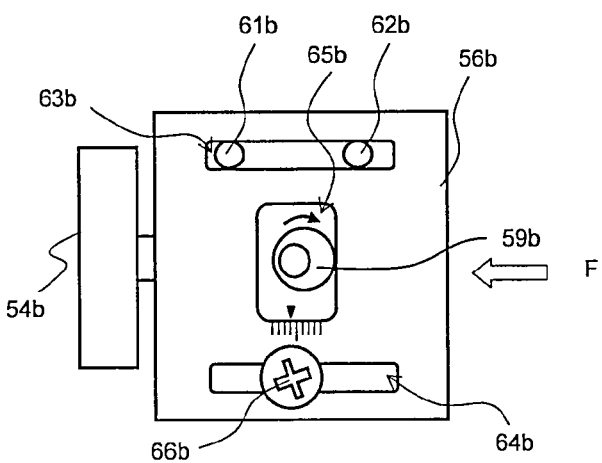
Figure 6C:
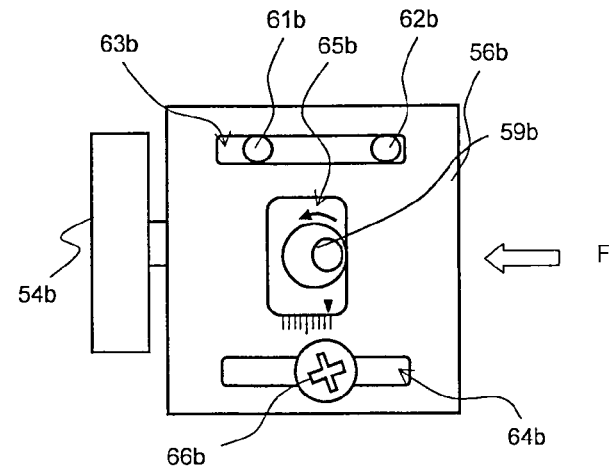

FIGS. 6B and 6C are explanatory views showing a condition of the pulley 56b viewed from the E-E' side of FIG. 6A. FIG. 6B shows a condition in which an eccentricity direction of the eccentric cam 59b is directed to the right side in a horizontal state, and FIG. 6C shows a condition in which the eccentricity direction of the eccentric cam 59b is directed to the left side in a horizontal state. The operator who adjusts the attachment position of the pulley support plate 56b displaces the pulley support plate 56b by rotating the grip part 69 while pushing the pulley support plate 56b in a direction shown by the arrow F. Then, after displacing the pulley support plate 56b to an appropriate position, the operator fixes it to the frame 35 by using a fixing screw 66b. Note that for convenience of adjustment, one of the frame 35 and the pulley support plate 56b may have an index, and the other of them may have a scale. Alternately, both of them may have a scale of different pitches such as a caliper. FIGS. 6B and 6C show an example that the index is given at the frame side and the scale is given on the fringe of the opening part 65b of the pulley support plate 56b.

In the aforementioned mechanism, the position of the supporting pulley 54b in the main-scanning direction can be adjusted.

Although the above description is given on the supporting pulley 54b, other supporting pulleys 54a, 55a, 55b also have a similar position adjustment mechanism.

Figure 30A:
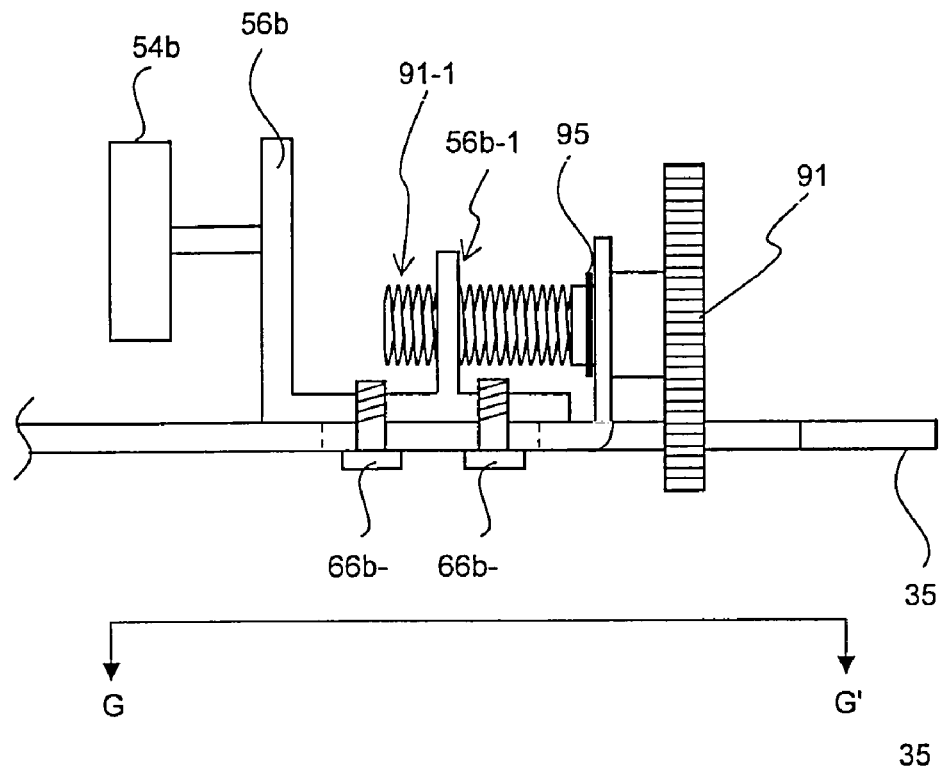
FIG. 30 is an explanatory view showing a different constitutional example of a position adjustment mechanism according to the present invention.
Figure 30B:
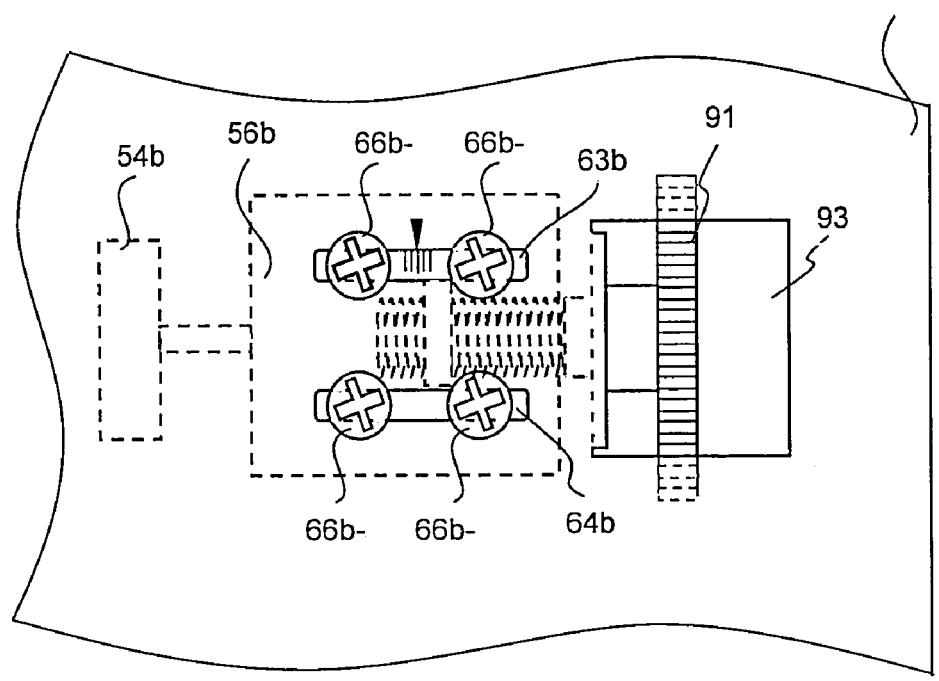

FIG. 30 is an explanatory view showing a constitutional example having a different position adjustment mechanism according to the present invention. FIG. 30A is an explanatory view of a condition in which the supporting pulley 54b is attached to the frame 35 via the pulley support plate 56b when viewed from above. FIG. 30B is an explanatory view of FIG. 30A viewed from the G-G' direction.

The frame 35 has the oblong hole parts 63b and 64b. The pulley support plate 56b is screwed by fixing screws 66b-1, 66b-2, 66b-3, 66b-4 inserted into the oblong hole parts 63b and 64b, and is fixed to the frame 35. In a state where each fixing screw is loosely fastened, the pulley support plate 56b is movable along a direction of the oblong holes.

In the frame 35, an adjusting screw 91 is rotatably supported by using an E-ring 95. There is a flat head portion at one end of the adjusting screw 91. The operator can touch a side face of the head portion from the outside of the frame 35 through a notch 93, and can rotate the adjusting screw 91 by vertically moving the side face of the head portion. The other end side of the adjusting screw 91 is a screw part 91-1 on which a screw thread is formed. The screw part 91-1 is screwed into a nut part 56b-1 provided on a part of the pulley support plate 56b. When the adjusting screw 91 is rotated, in association with this rotation, the pulley support plate 56b is linearly moved in a direction along the oblong holes.

The index is given on the fringe of the oblong hole 63b. In addition, the scale is given on the pulley support plate 56b exposed at the oblong hole part 63b. With such index and scale as a guide, the operator can perform adjustment. After the adjustment is completed, each fixing screw is fastened and the position of the pulley support plate 56b is fixed. Although the above description is given on the support pulley 54b, other supporting pulleys 54a, 55a, 55b also have a similar position adjustment mechanism.

Figure 7:
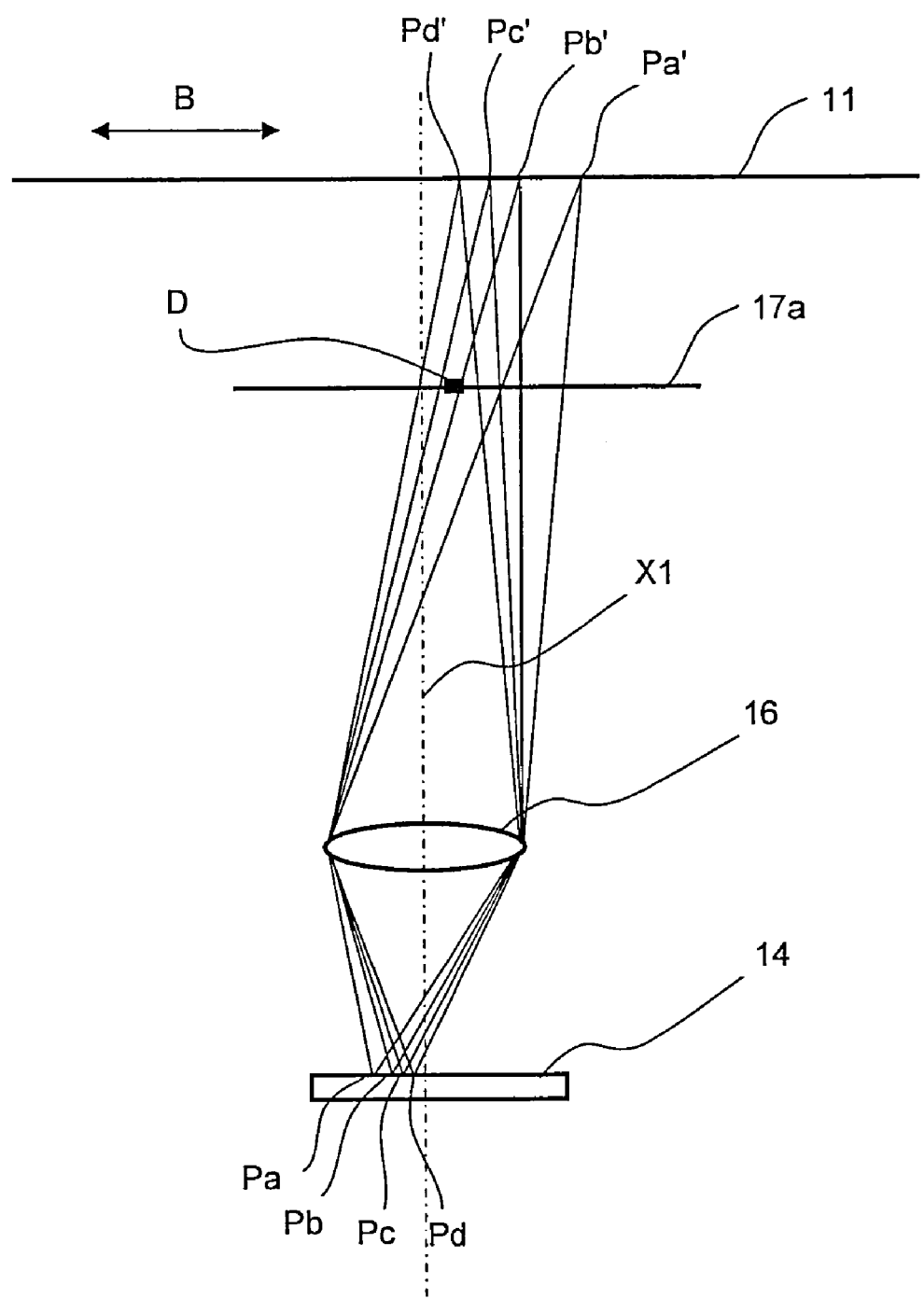
FIG. 7 is an explanatory view showing development of an optical path of an imaging optical system for focusing an image of a document placed on an original platen surface onto an imaging sensor in the document reading apparatus according to the present invention.
Figure 9A:
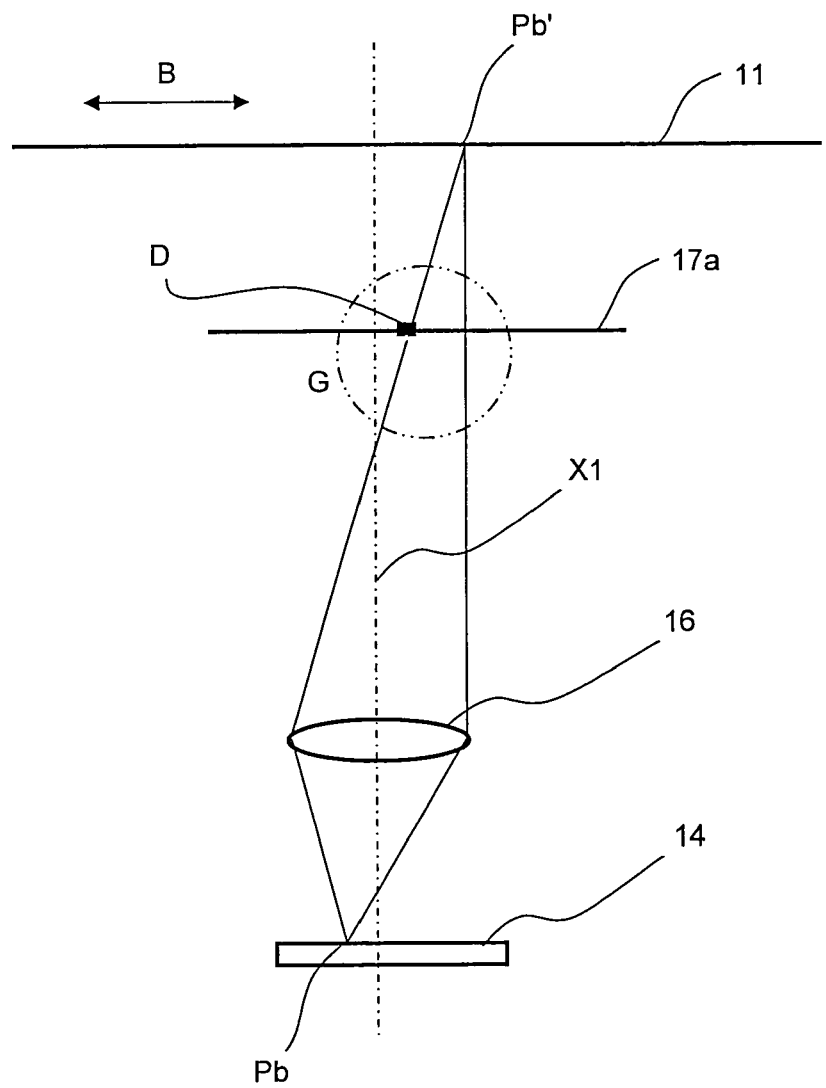
FIG. 9 is an explanatory view individually showing the optical path for each Pb-numbered pixel of FIG. 7.
Figure 9B:
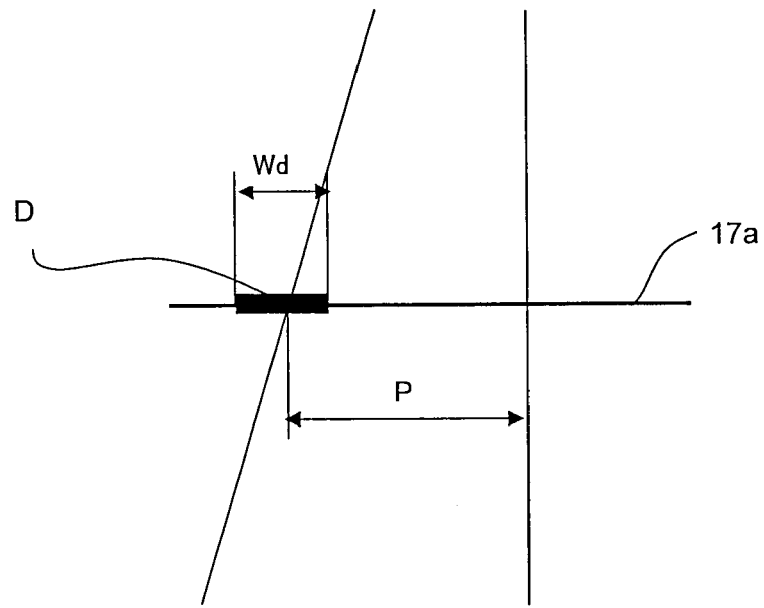

Necessity of the Position Adjustment of the Supporting Pulley—1. Adhesion of Dust to the First Mirror Next, description is given on an influence given to a read image by an adhered dust, when the dust is adhered to the first mirror 17a of the document reading apparatus according to the present invention. FIG. 7 is an explanatory view of a developed optical path of an imaging optical system 15 for focusing the image of the document placed on an original platen surface (shown by a reference numeral 11 in FIG. 2 as will be described later). X1 shown by a dashed-dotted line is the optical axis of the focusing lens 16. In the minification optical system, by using the first mirror 17a, the second mirror 17b, and the third mirror 17c, the direction of the optical path is bent at 90 degrees, and FIG. 7 shows the optical path developed on a plane. Note that a structure of the minification optical system 15 is described in detail with reference to FIG. 2. In FIG. 2, the direction in which the optical axis is projected on an original platen surface 11 is the reference direction along which the scanning direction of the first scanning section should follow.

In FIG. 7, the first mirror 17a is disposed at a place close to the original platen surface 11 in a part from the original platen surface 11 to the focusing lens 16 on the optical path. The arrow B along the original platen surface 11 shows the main-scanning direction. The main-scanning direction is the direction in which the pixels of the imaging sensor 14 align. The imaging sensor reads the image of the original platen surface 11, by n-pixels. In FIG. 7, point Pa' on the original platen surface 11 is read as the Pa-numbered pixel out of the n-pixels. Although the point Pa' is, to be specific, a minute region having a width of about 40 μm, for example, description is given here, regarding it as a point. The point read as the Pb-numbered pixel slightly set apart from this point is Pb'. Further, point Pc' is read as the Pc-numbered pixel slightly set apart from Pb, and point Pd' is read as the Pd-numbered pixel. Each pixel of Pa-, Pb-, Pc-, and Pd-numbered pixels, a pupil of the focusing lens 16, and a straight line connecting the pupil of the focusing lens 16 and each point of Pa', Pb', Pc', and Pd' show the optical path in which each point Pa', Pb', Pc', and Pd' on the original platen surface 11 is focused respectively on the Pa-, Pb-, Pc-, and Pd-numbered pixel on the imaging sensor 14.

Now, it is assumed that a dust D is adhered to the first mirror 17a.

FIGS. 8 to 11 are explanatory views individually showing the optical path regarding each pixel of Pa-, Pb-, Pc-, and Pd-numbered pixels of FIG. 7. FIG. 9B is an enlarged view of a part G surrounded by a circle in FIG. 9A. As shown in FIG. 9B, a width of the optical path of the Pb-numbered pixel on the first mirror 17a is set as P. Approximately the same width as P of the optical path is set for other pixels. In addition, the width of the dust D is assumed to be Wd. The width P is dependent on the ratio of the distance from the point Pb' to the center of the focusing lens 16 and the distance from the point Pb' to the first mirror 17a, on the optical path (center of the optical path) from the point Pb' to the Pb-numbered pixel of the imaging sensor 14 through the center of the focusing lens 16, and further is dependent on the diameter of the pupil of the focusing lens 16.

As an example, when the distance from the point Pb' to the center of the focusing lens 16 is 420 mm, the distance of the center of the optical path from the point Pb' to the first mirror 17a is 25 mm, and a pupil diameter of the focusing lens 16 is 20 mm, the width P is 1.2 mm. The size Wd of the dust D adhered to the first mirror is assumed to be 0.2 mm.

Figure 10:
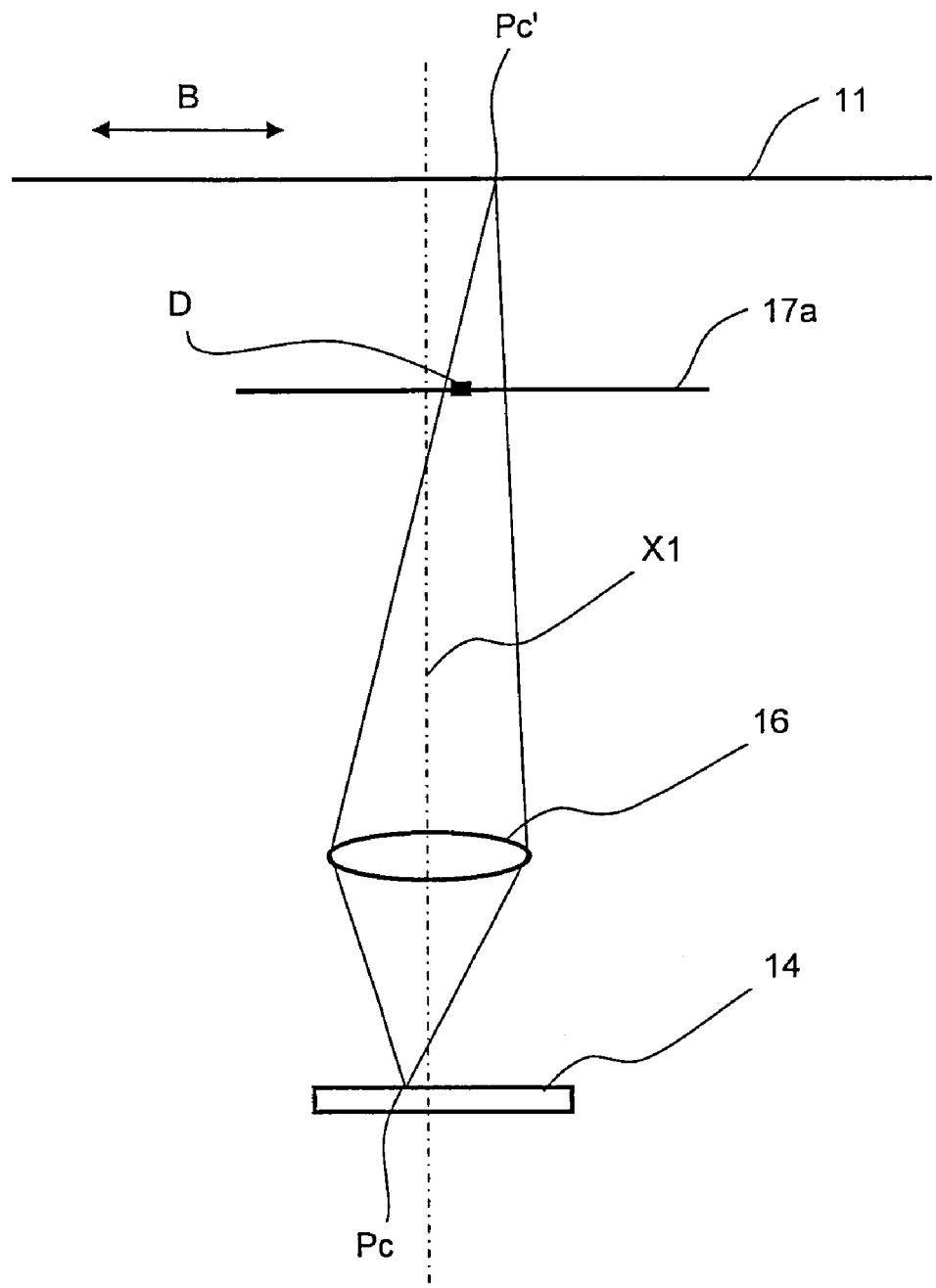
FIG. 10 is an explanatory view individually showing the optical path for each Pc-numbered pixel of FIG. 7.
Figure 11:
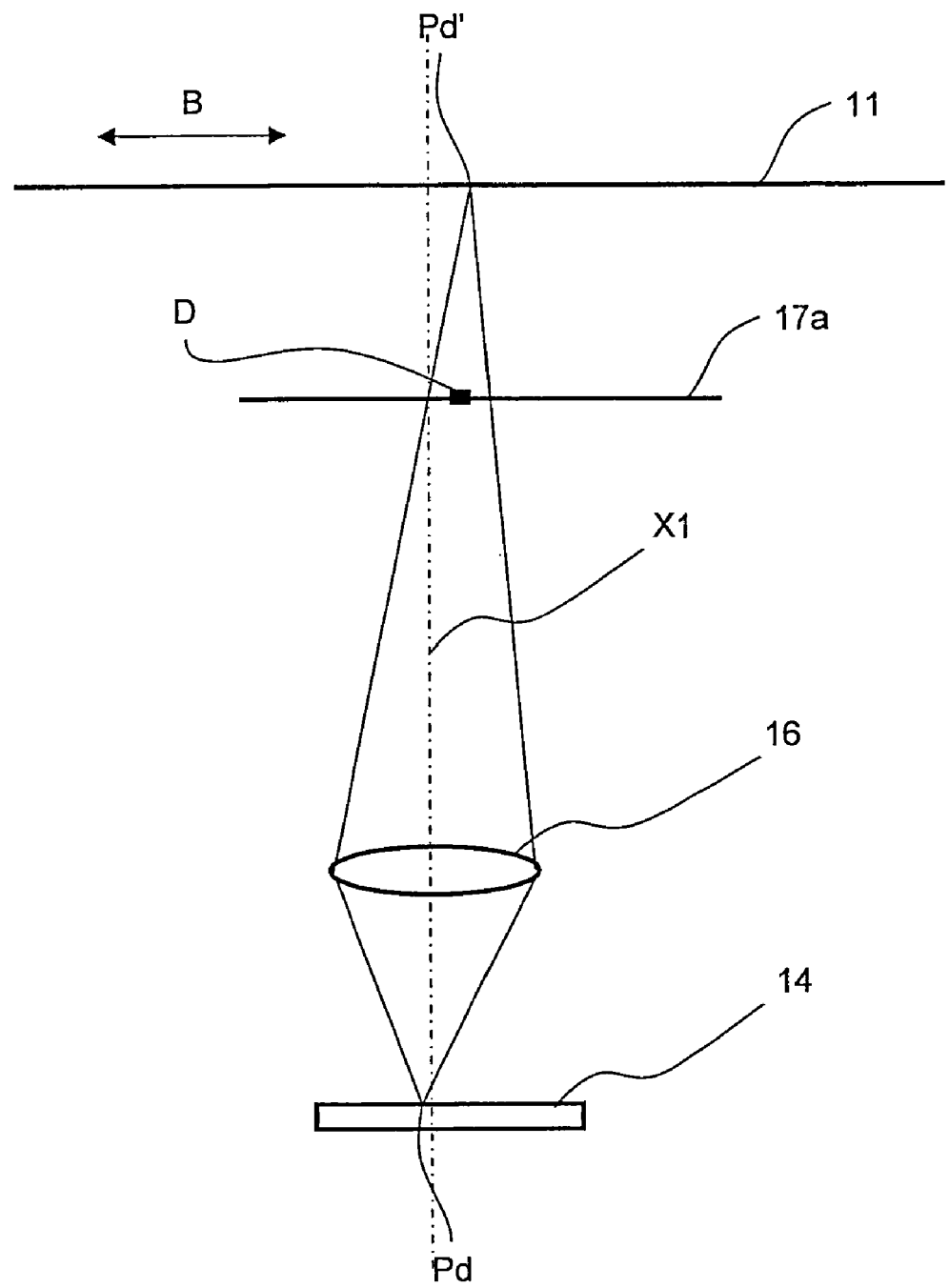
FIG. 11 is an explanatory view individually showing the optical path for each Pd-numbered pixel of FIG. 7.

When the original platen surface 11 is a reference white board 3 for shading correction (see FIG. 2 and description therefor for details) or when a document is a white-ground document corresponding to the reference white board 3, as shown in FIG. 8, the dust D is deviated from the optical path of the Pa-numbered pixel, and therefore the Pa-numbered pixel receives all light to be received from the point Pa'. However, the Pb-numbered pixel only partially receives the light to be received from the point Pb', because the optical path is shielded by a part of the dust D. Also, the Pc- and Pd-numbered pixels only partially receive the light to be received from the points Pc' and Pd', because as shown in FIGS. 10 and 11, the optical paths are shielded by the entire width of the dust D.

Figure 12:
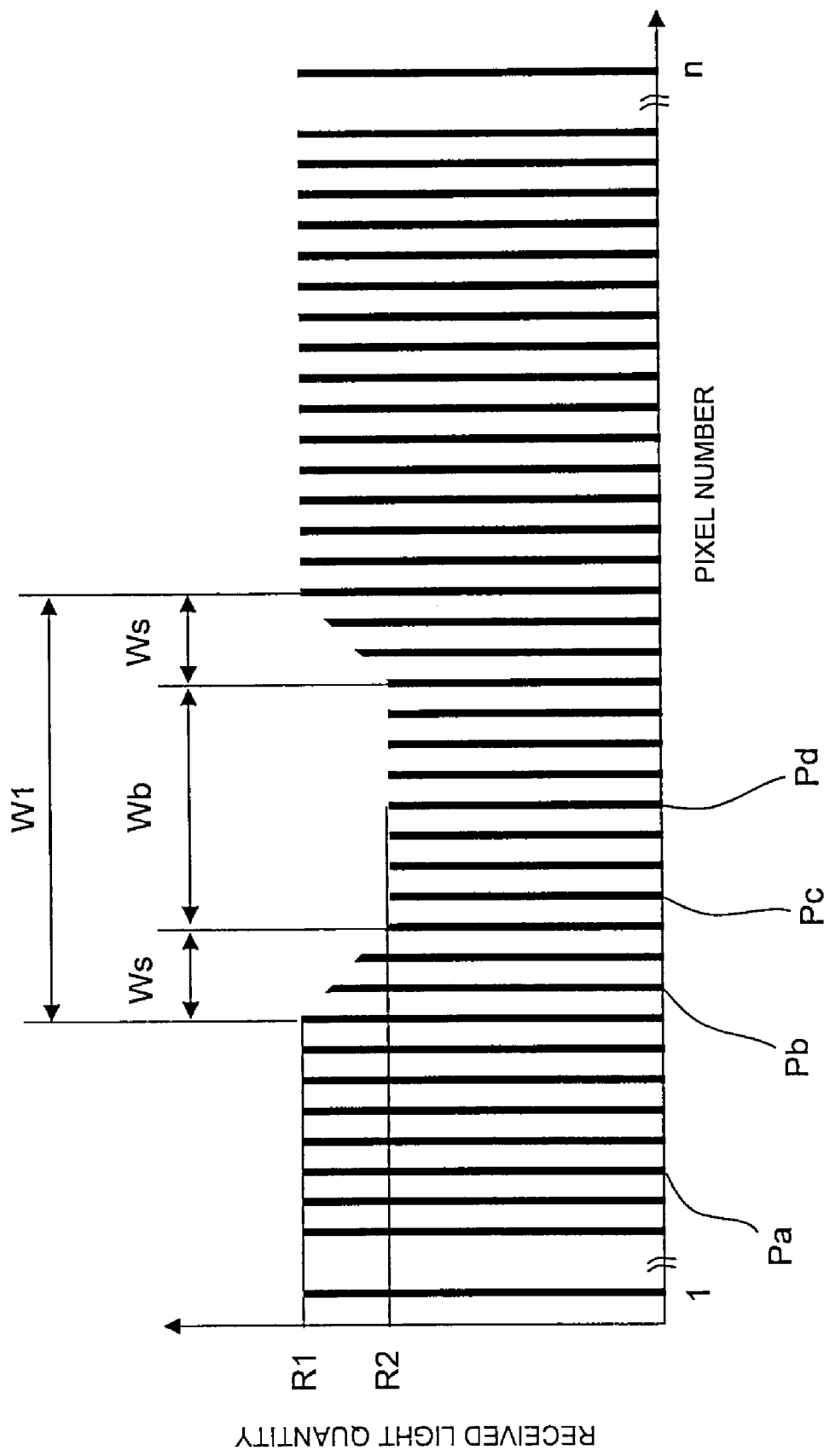
FIG. 12 is a graph showing a received light quantity of each pixel of the imaging sensor in FIG. 7 or FIGS. 8 to 11.

FIG. 12 is a graph showing a received light quantity of each pixel of the imaging sensor 14 in FIG. 7 or FIGS. 8 to 11. In FIG. 12, each pixel of 1- to n-numbered pixels of the imaging sensor 14 is shown on the abscissa axis, and the received light quantity of each pixel is shown on the ordinate axis. The position of each pixel of the Pa-, Pb-, Pc-, and Pd-numbered pixels is shown on the abscissa axis. As described above, the Pa-numbered pixel can receive a light quantity R1 to be received originally, because this pixel is not affected by the dust D. However, the Pc- and Pd-numbered pixels are the pixels whose optical paths are shielded by the dust D (a center region of a blurred image of the dust D is captured), and therefore only the received light quantity of R2 can be obtained. The Pb-numbered pixel is the pixel whose optical path is shielded by a part of the dust D (an outline region of the blurred image of the dust D is captured), and therefore the received light quantity is between R1 and R2. The center of the image of the dust D is captured in the Pc-numbered pixel. In the aforementioned example of numerical values, the width P of the optical path is 1.2 mm, and the width Wd of the dust D is 0.2 mm. In the Pc- and Pd-numbered pixels, the widths of the optical paths are 1.2 mm, and the optical paths are shielded only by 0.2 mm. Therefore, the ratio R1:R2 between the received light quantities of both the pixels is equal to the ratio between the widths of the effective optical paths as 1.2:(1.2−0.2)=1.2:1.0. In addition, the pixel whose the optical path is shielded by the width Wd of the dust D is the pixel in a region of the width Wb in FIG. 12. Further, the pixel whose optical path is shielded by a part of the dust D exists over the width of Ws on both sides of Wb, respectively. Accordingly, the pixel located in the region of the width satisfying W1=Ws+Wb+Ws is affected by the dust D.

However, when the shading correction is performed with the dust D adhered, an adjustment is made so as to read the reference white board 3 and each pixel output is made constant. More specifically, an amplification factor of a circuit not shown for amplifying and A/D-converting a pixel output signal from the imaging sensor 14, or a conversion characteristic of A/D conversion is corrected for each pixel, and is set to obtain a prescribed pixel output value V1. The set amplification factor or the A/D conversion characteristic is held, and the characteristic thus held is used for reading the image thereafter. The circuit for changing the amplification factor or the A/D conversion characteristic for each pixel is well known in this technical field and is not the subject matter of the present invention, and therefore a detailed description thereof is omitted.

Figure 13:
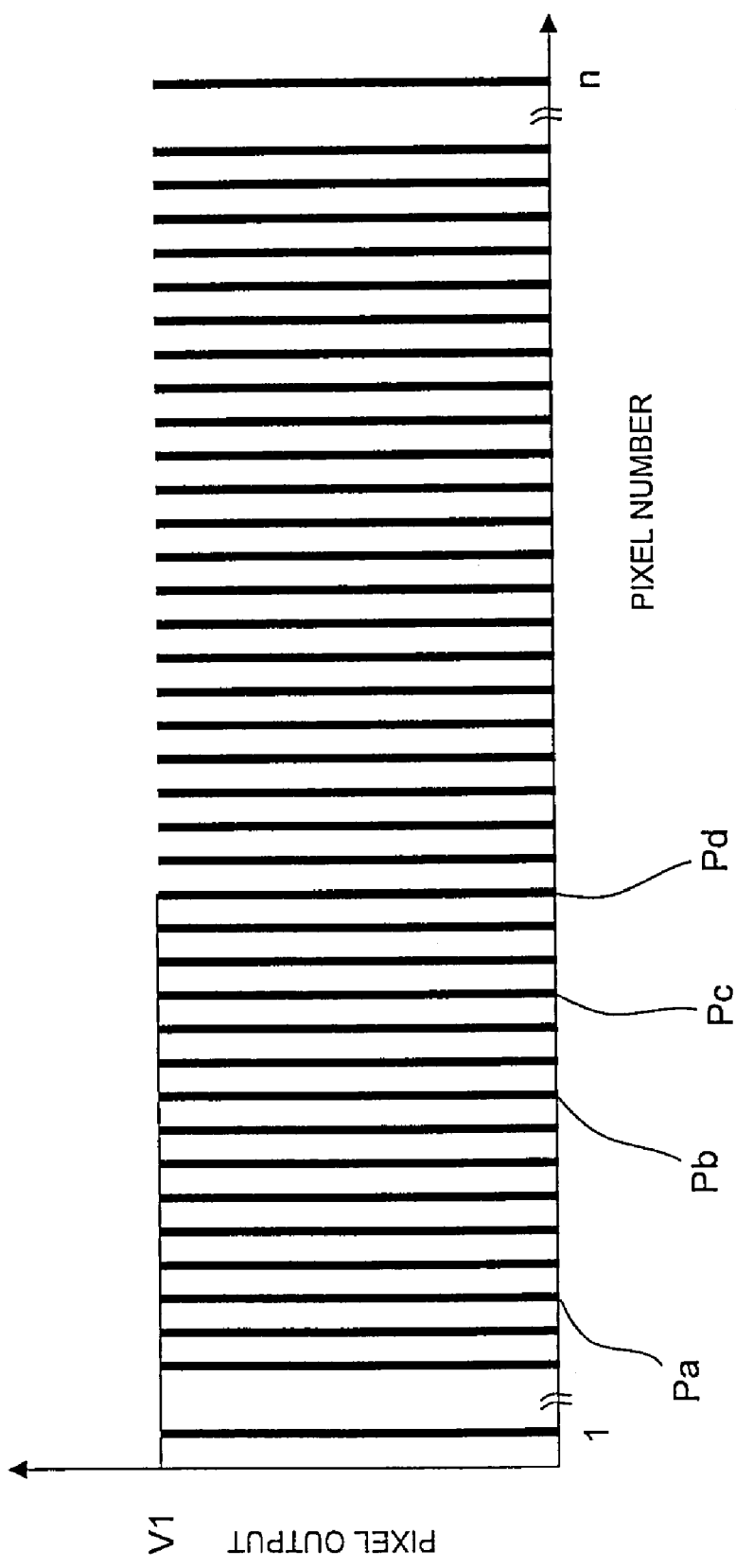
FIG. 13 is a graph showing a pixel output value of each pixel after shading correction is performed including a dust, in the document reading apparatus according to the present invention.

FIG. 13 is a graph showing a pixel output value of each pixel after the shading correction is made including the dust D, in the document reading apparatus according to the present invention. In the same way as in FIG. 12, each pixel of the imaging sensor 14 is taken on the abscissa axis, and the pixel output is taken on the ordinate axis. For example, the shading correction is performed every time the power source of the document reading apparatus is set-on. Accordingly, even when the dust is adhered to the first mirror 17a, there is an effect that an influence of the dust is offset or is made inconspicuous when the shading correction is performed. However, there is a further problem caused by the dust.

Necessity of the Position Adjustment of the Supporting Pulley—2. Deviation Between the Moving Direction of the Scanning Section and the Optical Axis Direction of the Focusing Lens As shown in FIG. 1, when the direction (reference direction) of an optical axis X1 of the focusing lens 16 and a moving direction X2 of the first scanning unit 21 and the second scanning unit 22 are parallel to each other, the pixel that is influenced by the dust D (the pixel that allows a blurred image of the dust D to be captured) is not changed even when the first scanning unit 21 moves from the reference white board 3. Accordingly, the influence of the dust is offset or suppressed. However, when the optical axis X1 and the moving direction X2 are not parallel to each other, the pixel that allows the image of the dust D to be captured is changed. In this case, the influence of the dust appears.

Figure 16:
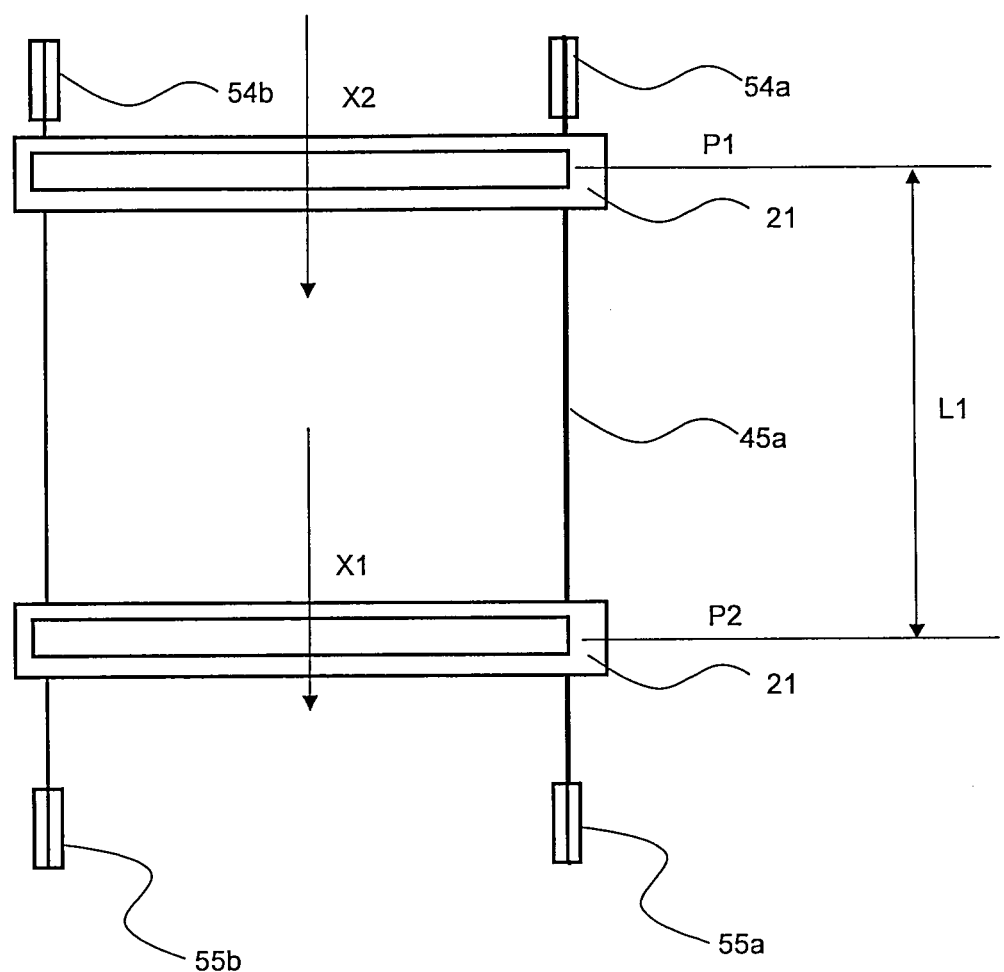
FIG. 16 is an explanatory view showing a case in which a direction of an optical axis and a moving direction of a first scanning unit are parallel to each other, in the document reading apparatus according to the present invention.
Figure 17:
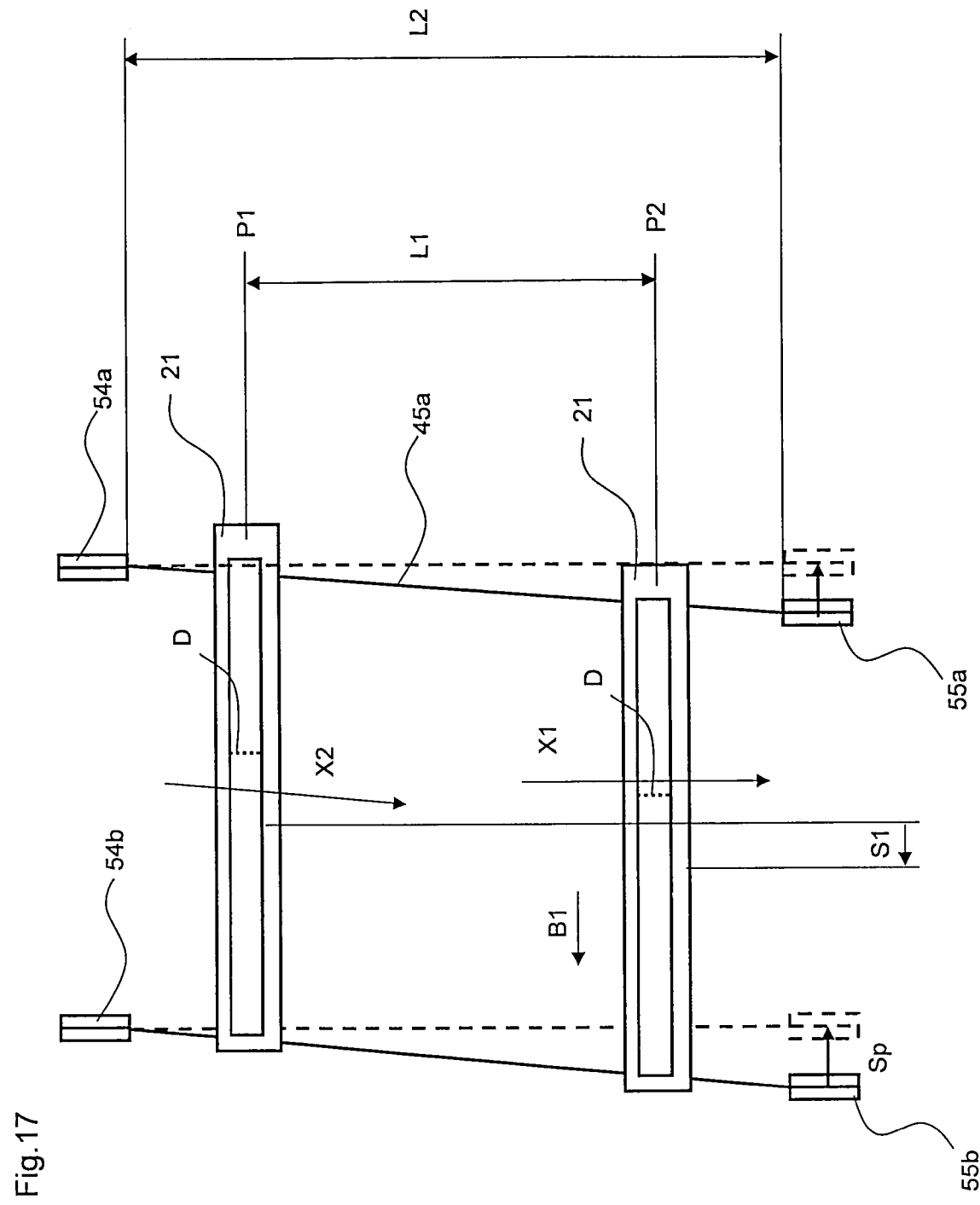
FIG. 17 is an explanatory view showing a case in which the direction of the optical axis and the moving direction of the first scanning unit are not parallel to each other, in the document reading apparatus according to the present invention.

FIGS. 16 and 17 are explanatory views showing the direction of the optical axis X1 and the moving direction X2 of the first scanning unit 21, in the document reading apparatus according to the present invention. FIG. 16 is an explanatory view showing a relation between the direction of the optical axis X1 and the moving direction X2 of the first scanning unit 21. FIG. 16 shows a case in which the moving direction X2 is parallel to the optical axis X1. In this case, even when the first scanning unit 21 moves by distance L1 from a position P1 at the starting side for scanning of the original platen surface 11 in the vicinity of the reference white board 3 to a position P2 at the ending side for scanning of the original platen surface 11, the pixel which allows the image of the dust D to be captured is not changed. Accordingly, the pixel output is made uniform by the effect of the shading correction.

Figure 18:
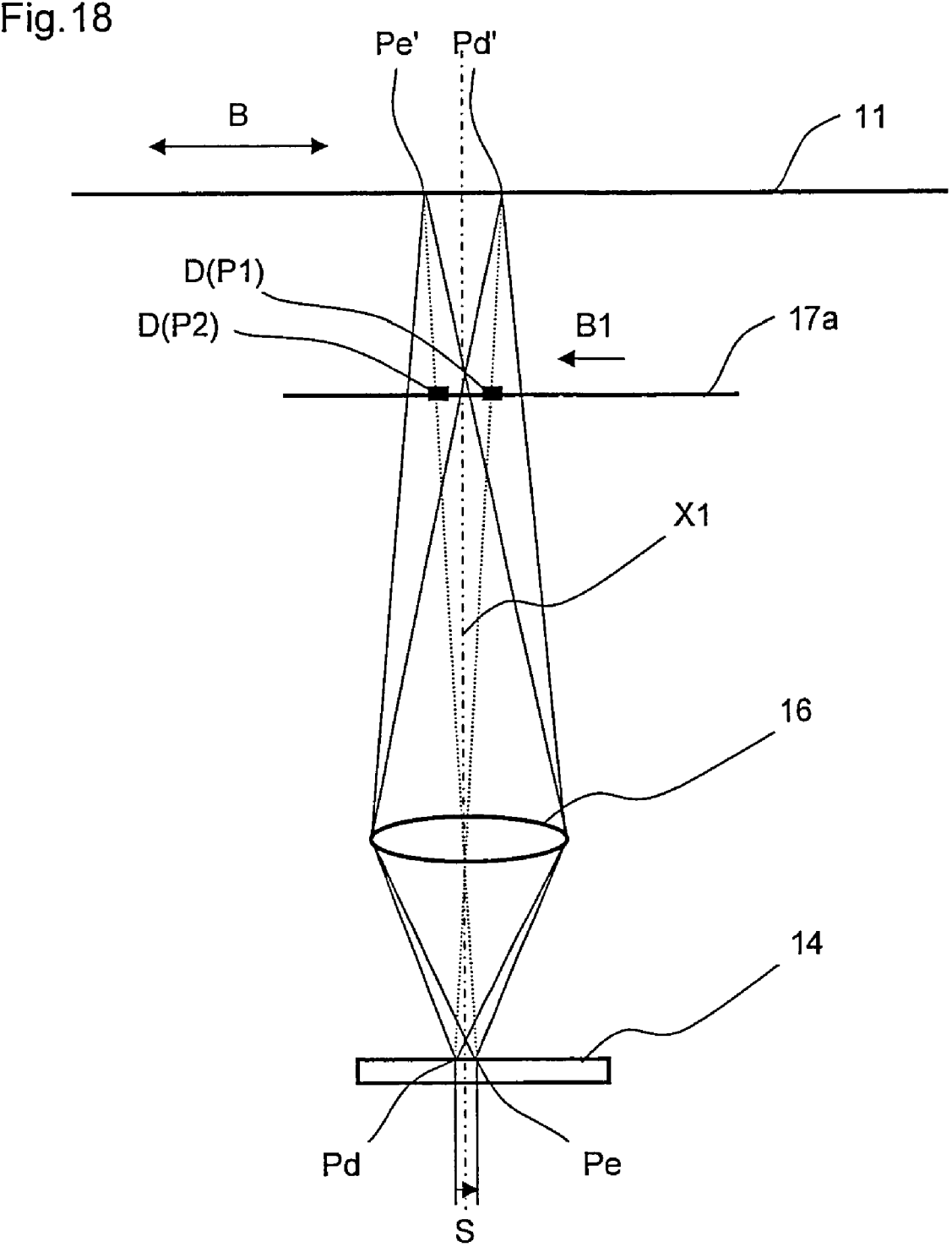
FIG. 18 is an explanatory view showing development of the optical path of the imaging optical system when the position of the dust changes at the position P1 and the position P2, because the optical axis and the moving direction are not parallel to each other, in a document feeding apparatus according to the present invention.

FIG. 17 is a case in which the optical axis X1 is not parallel to the moving direction X2. In this case, when the first scanning unit 21 moves to the position P2, the dust D moves in a direction shown by the arrow B1. The S numbers of pixels that allow the image of the dust D to be captured, are deviated to the opposite side of the arrow B1, with respect to the movement from the position P1 to the position P2 on the imaging sensor 14. FIG. 18 is an explanatory view showing a developed optical path of the imaging optical system 15 when the position of the dust D changes between the position P1 and the position P2 because the optical axis X1 and the moving direction X2 are not parallel to each other. In FIG. 18, the position of the dust D at the position P1 is D(P1). The dust D(P1) is positioned at the center of the optical path of the Pd-numbered pixel. Meanwhile, the position of the dust D at the position P2 is D(P2) deviated from the D(P1) in the direction shown by the arrow B1. The dust D(P2) is positioned at the center of the optical axis of the Pe-numbered pixel. Difference between Pd and Pe is S.

Figure 14:
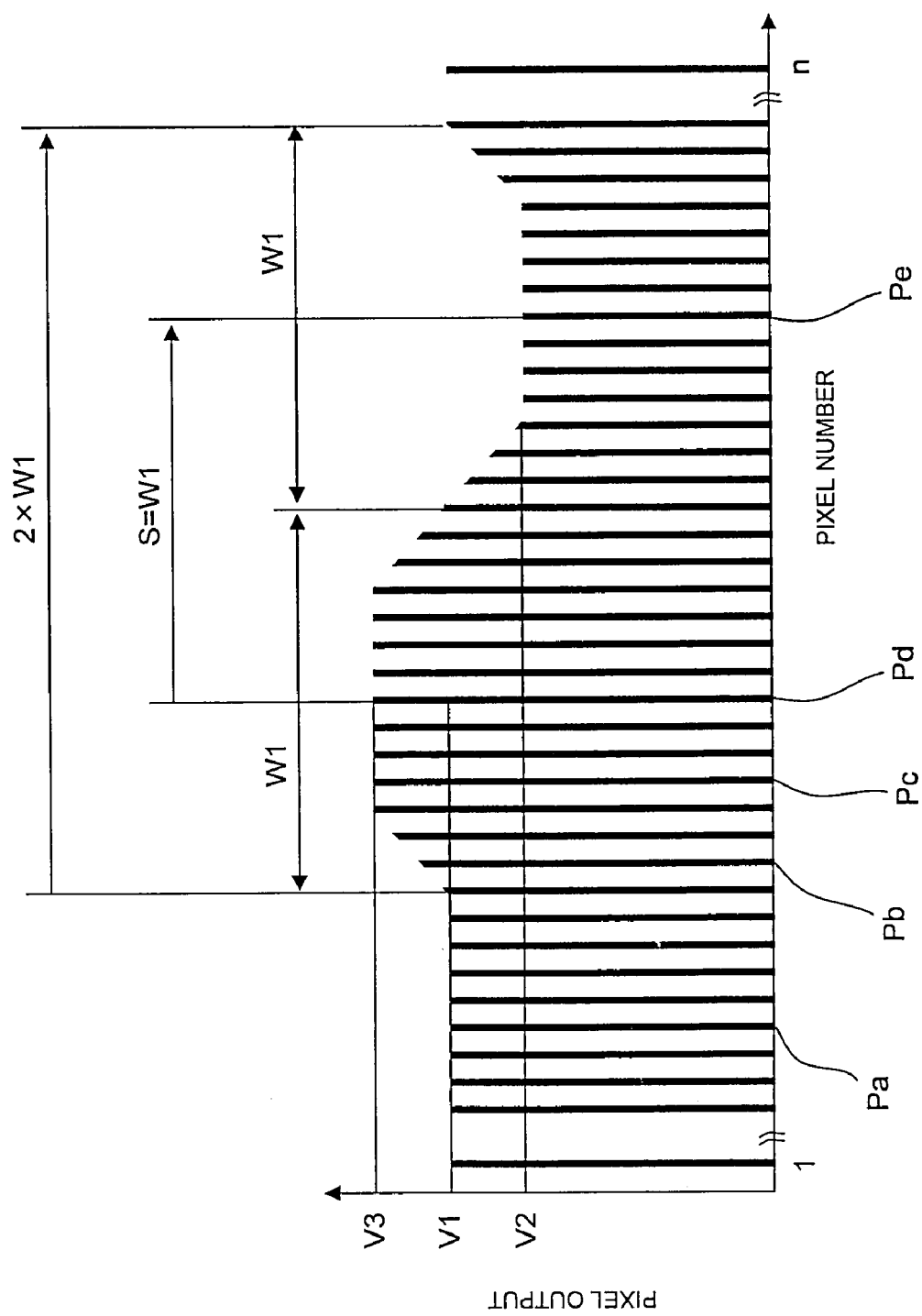
FIG. 14 is a graph showing each pixel output in position P2 when a center of the dust is deviated at positions P1 and P2, in the document reading apparatus according to the present invention.

FIG. 14 is a graph showing each pixel output at the position P2 when the center of the dust D is deviated between the position P1 and the position P2. In the same way as in FIG. 13, each pixel and the pixel output are taken on the ordinate axis. FIG. 14 shows a case in which a deviation quantity S is equal to a width W1 of the image of the dust D.

The Pd-numbered pixel receives a light quantity R2 because the center portion of the optical path is shielded by the dust D(P1) at the position P1 (see FIG. 12). In this state, the shading correction is performed, and the sensitivity is improved compared with the sensitivity where no dust is present. However, at the position P2, the optical path of the Pd-numbered pixel is not shielded by the dust D(P2), and therefore the received light quantity becomes R1. Accordingly, the pixel output at P2 becomes a value V3 larger than V1. Here, V1 is the pixel output value when there is no influence of the dust D. Meanwhile, the Pe-numbered pixel receives the light quantity R1, with the optical axis not shielded by the dust D(P2) at the position P1 (see FIG. 12). In this state, the shading correction is performed. However, the center portion of the optical path of the Pe-numbered pixel is shielded by the dust D(P2) at the position P2. Therefore, the received light quantity of the Pe-numbered pixel becomes R2. Accordingly, the pixel output at the position P2 becomes a value V2 smaller than V1.

As shown in FIG. 14, the entire width of a convex portion and a concave portion of the pixel output is twice the width W1. Namely, the width of the convex portion and the concave portion is twice the width before performing the shading correction. In addition, the ratio of the pixel output V2 of the concave portion to the pixel output V1 not influenced by the dust D is equal to the ratio of R2 to R1. The pixel output V3 of the convex portion to V1 is an offset portion by the shading correction, and therefore is approximately equal to the inverse number of the ratio of R2 to R1. Accordingly, the difference between the pixel outputs in the convex portion and the concave portion is approximately twice the difference before performing the shading correction. As a result, both width and depth of the convex portion and the concave portion become larger, and the influence of the dust appears remarkably.

Figure 15:
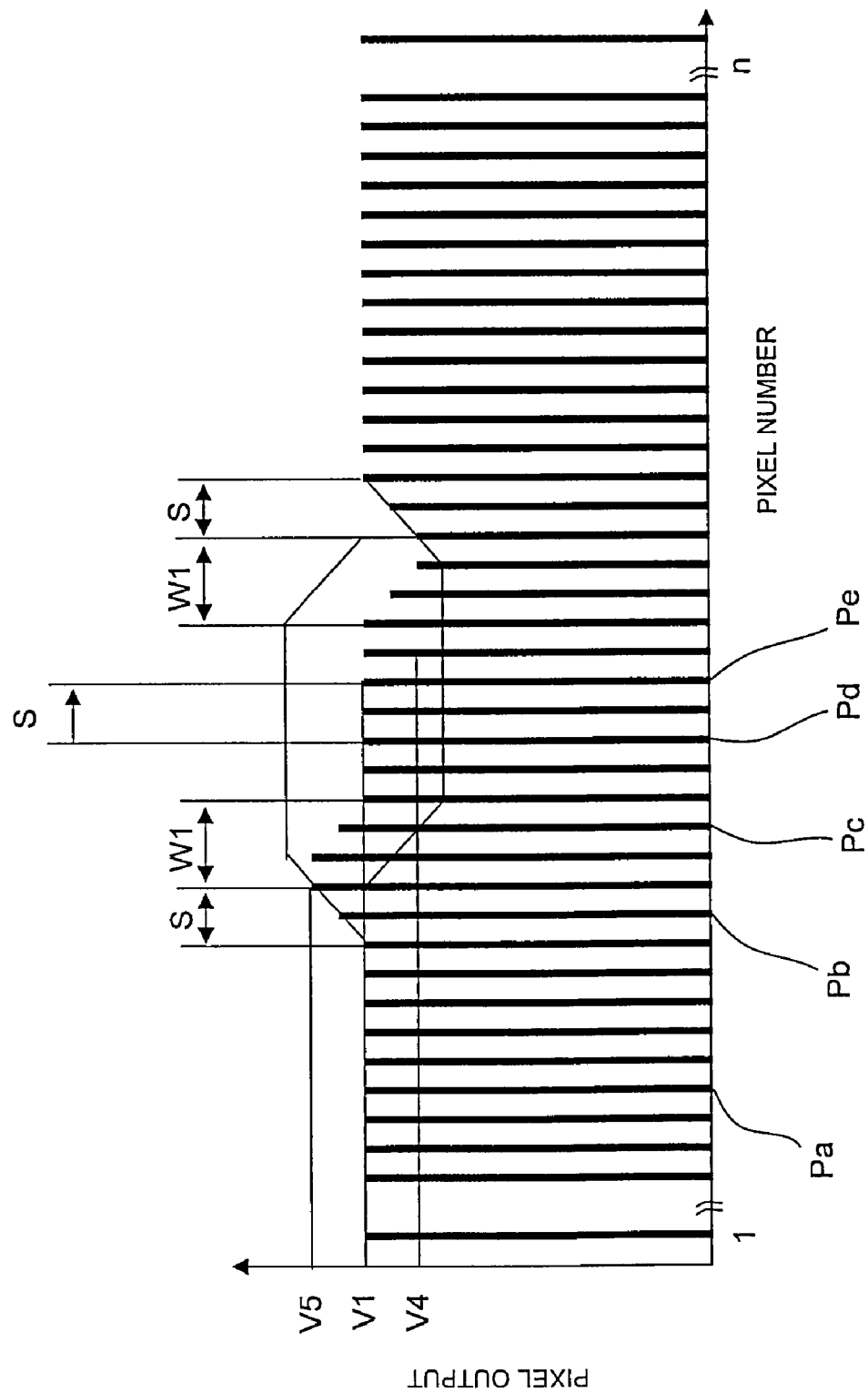
FIG. 15 is a graph showing each pixel output at position P2, when a deviation quantity S is smaller than Ws, in the document reading apparatus according to the present invention.

The document reading apparatus 2 according to the present invention is capable of adjusting the position of the supporting pulley and making the moving direction X2 and the optical axis X1 parallel to each other. When the moving direction X2 can be made completely parallel to the optical axis X1, uniform pixel outputs as shown in FIG. 13 can be obtained at position P2 also. Precise adjustment is required for making completely parallel adjustment with the resolution of one pixel. For example, when reading resolution is 600 dpi, the width of one pixel is about 40 micrometers. However, even if a slight deviation occurs, when the deviation quantity is smaller than the width W1, more improvement is expected than in FIG. 14. Preferably, the deviation quantity is adjusted to be Ws or less. FIG. 15 is a graph showing each pixel output at position P2, when the deviation quantity S is Ws or less, in the document reading apparatus according to the present invention. In this case, since the deviation quantity S is larger than one pixel, a convex portion and a concave portion appear in the pixel output. However, the width of the convex/concave portions is (S+Ws)×2, and is smaller than the width of the convex/concave portions in FIG. 14. Regarding the depth of the convex/concave portions also, the depth of the convex/concave portions in FIG. 15 is smaller than the depth of the convex/concave portions in FIG. 14.

Calculation of the Adjustment Amount of the Position of the Supporting Pulley—No. 1

Figure 19:
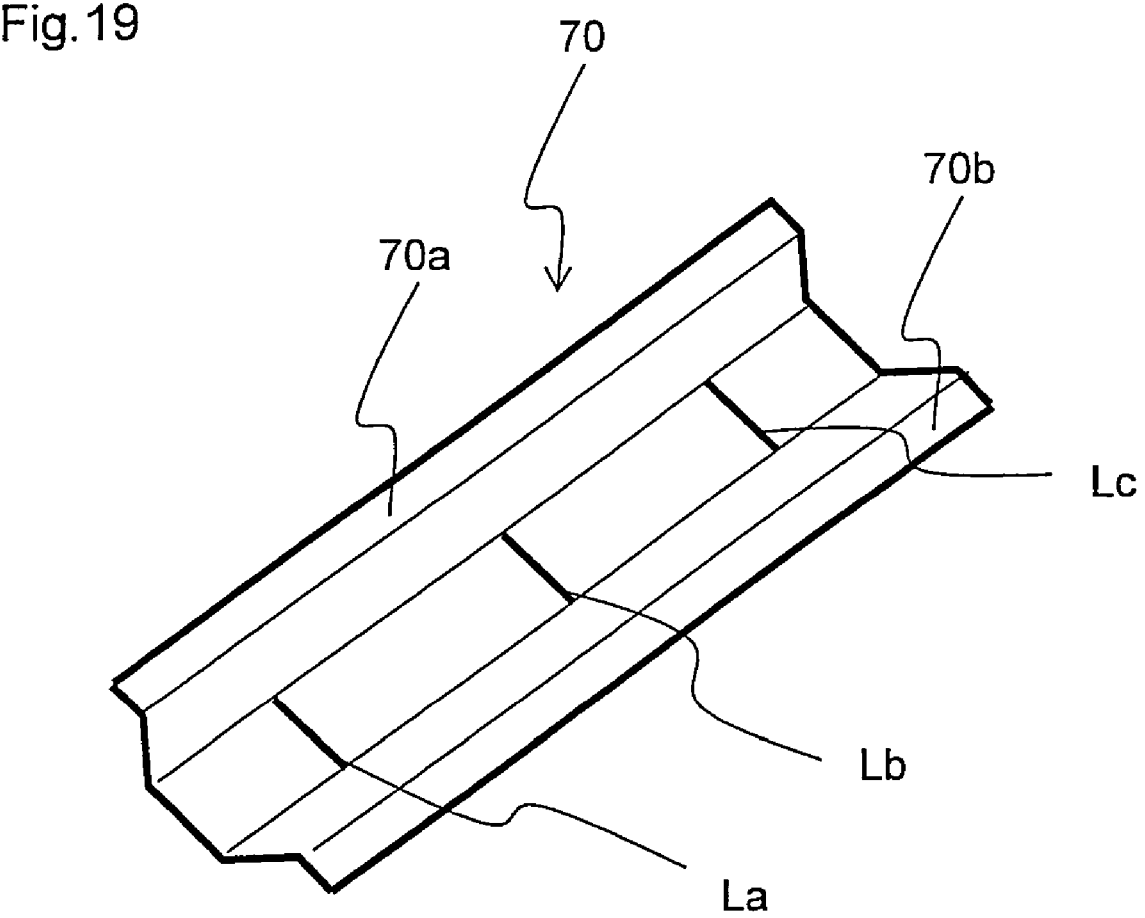
FIG. 19 is a perspective view showing an example of an adjustment chart used for adjustment of the document feeding apparatus according to the present invention.

Description will be given below on a method of obtaining the adjustment amount so that the moving direction X2 is made parallel to the optical axis X1. A chart (adjustment chart) on which the image for adjustment is given is placed in the first scanning unit 21, the image is read at the positions P1 and P2, and based on the result, the adjustment amount can be calculated. The adjustment chart may be attached onto the first mirror, for example. However, in order to obtain a sharp image, the image for adjustment is preferably positioned to have the same optical path length as the original platen surface 11. FIG. 19 is a perspective view showing an example of the adjustment chart used in adjusting a document feeding apparatus according to the present invention. FIG. 19 shows the adjustment chart 70 formed into a trapezoidal shape in cross section vertical to a longitudinal direction. Three straight lines La, Lb, Lc orthogonal to the longitudinal direction (corresponding to the main-scanning direction) are marked inside of an upper bottom part. Flat placement parts 70a and 70b are provided from lower edges of both skirts of the trapezoid to the outside. The placement parts 70a and 70b are placed on the upper surface of the first scanning unit 21. The adjustment chart 70 is formed so that an aluminum molded product or a molded product of steel sheet is painted in white and images for adjustment La, Lb, and Lc are drawn in black thereon.

Figure 20:
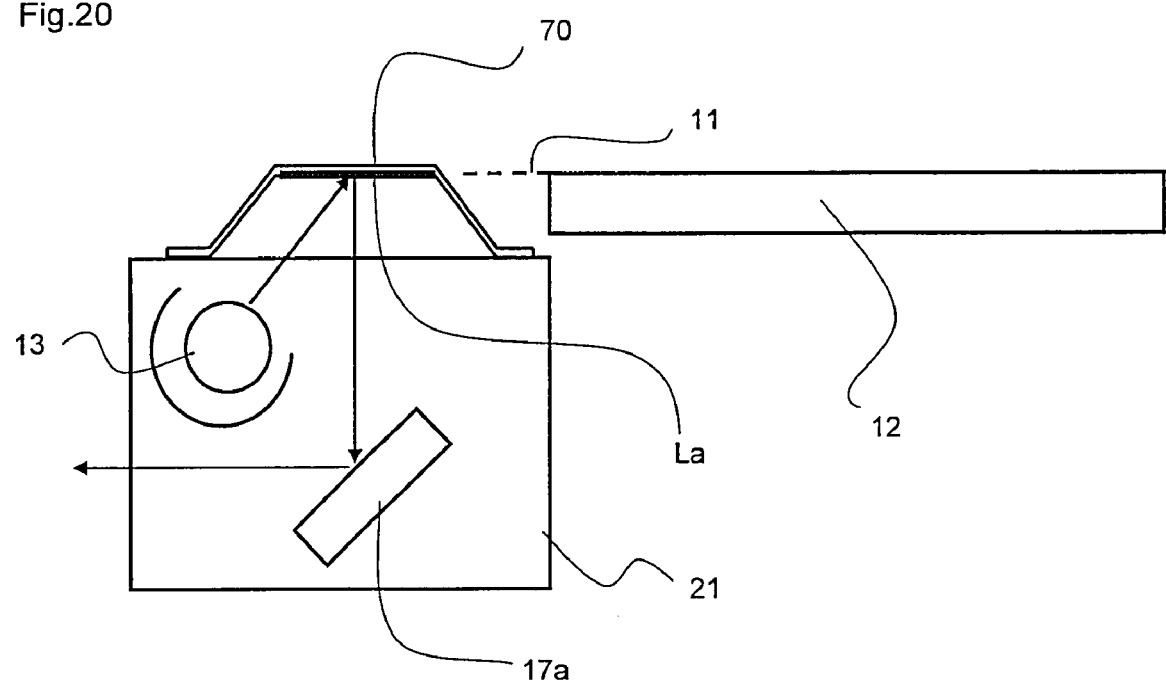
FIG. 20 is an explanatory view showing a state in which an adjustment chart is placed on an upper surface of the first scanning unit of FIG. 1.

During adjustment, an operator opens an upper side of the first scanning unit 21 by detaching an original platen 12, and places the adjustment chart 70 on the first scanning unit 21. FIG. 20 is an explanatory view showing a state in which the adjustment chart 70 is placed on the upper surface of the first scanning unit 21 of FIG. 1. In this state, the images for adjustment La, Lb, and Lc are positioned at a height almost equal to the height of the original platen surface 11.

Thereafter, the operator makes the document reading apparatus 1 execute a program prepared for adjustment. An instruction to execute the program is given by causing a CPU of the document reading apparatus 1 to recognize the instruction through an external device such as a personal computer connected to a communication section 8, or by causing the CPU to recognize the instruction by the operator performing a prescribed operation using an operation panel not shown provided in the document reading apparatus. Note that the function of the CPU will be described later in detail in the description part of the structure of the document reading apparatus.

It is preferable that the CPU executes the program for adjustment. The CPU executes processing in the following procedure, in accordance with the program for adjustment.

Figure 21:
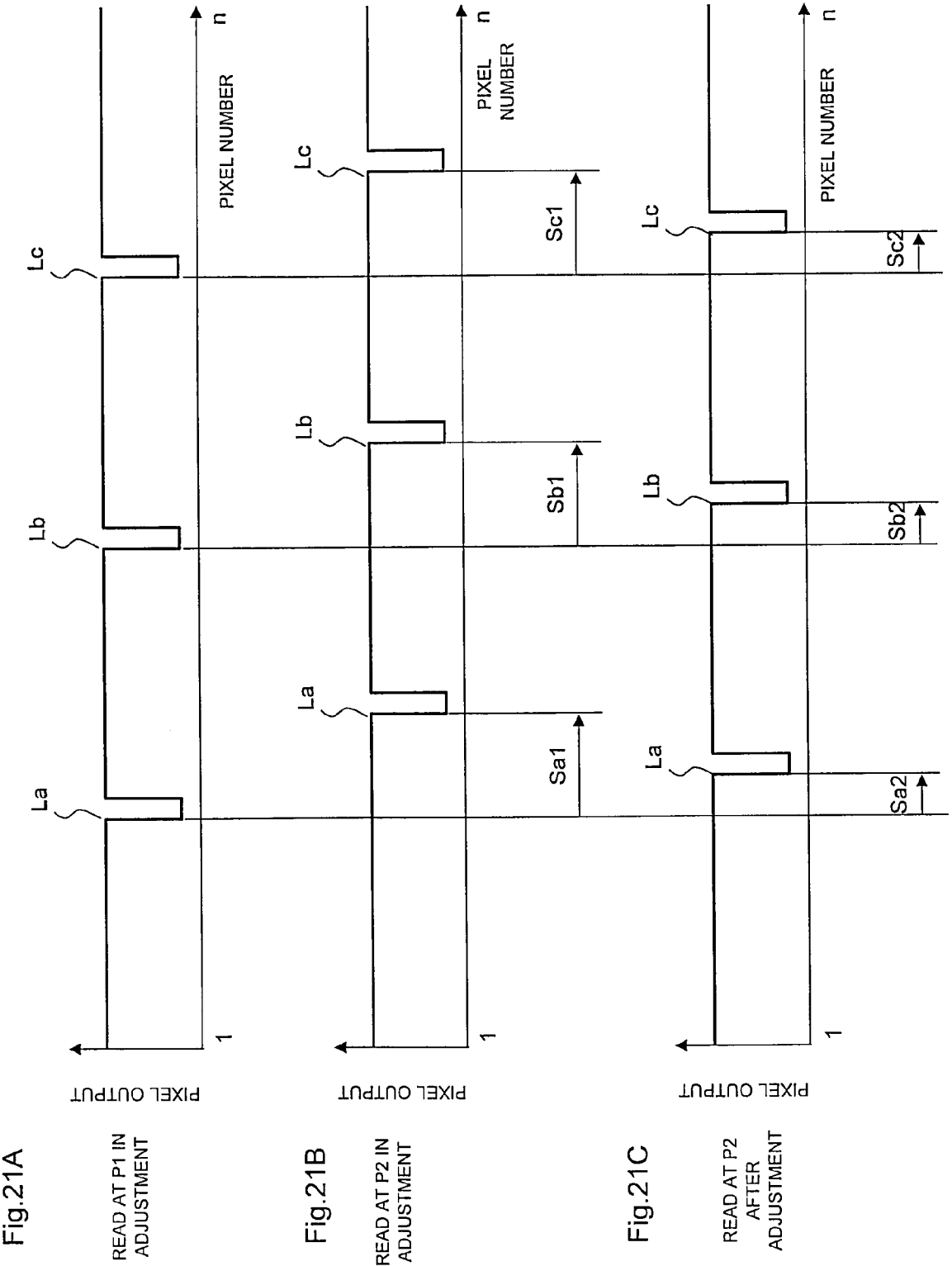
FIG. 21 is a graph showing a signal of an adjustment image read at the positions P1 and P2, respectively, in the document feeding apparatus according to the present invention.

First, the first scanning unit is moved to the position P1. At the position P1, the CPU irradiates the adjustment chart 70 with a light source 13, whereby the images for adjustment La, Lb, and Lc are read by the imaging sensor 14. FIG. 21 is a graph showing a signal of the adjustment image read at the positions P1 and P2, respectively, in the document feeding apparatus according to the present invention. In FIG. 21, time is taken on the abscissa axis, and with the elapse of time, the signal of each pixel of 1 to n in the main-scanning direction is read and outputted. FIG. 21A shows a read signal at the position P1. The CPU acquires the time required for reading the images for adjustment La, Lb, and Lc, namely, the value of the pixel in a certain pixel order in the main-scanning direction, and stores it in a RAM.

Next, by the CPU, the first scanning unit is moved to the position P2, and the images for adjustment La, Lb, and Lc are read by the imaging sensor 14. Then, the CPU acquires the time required for reading the images for adjustment La, Lb, and Lc, namely, the value of the pixel in a certain pixel order in the main-scanning direction, and stores it in the RAM.

Subsequently, by the CPU, the difference (deviation quantity) in the position between the image read at position P1 and the image read at the position P2 is calculated. Namely, a deviation quantity Sa1 is obtained for the image for adjustment La. In addition, a deviation quantity Sb1 for the image for adjustment Lb and a deviation quantity Sc1 for the image for adjustment Lc are obtained. An average S1 of deviation quantities thus obtained is obtained to be a final deviation quantity. Then, from the final deviation quantity, an adjustment amount Sp for the supporting pulley is calculated. The Sp can be calculated by converting the deviation quantity S1 by the ratio between the distance L1 between the positions P1 and P2 shown in FIG. 17 and the distance L2 between the supporting pulley at the starting side for scanning and the supporting pulley at the ending side for scanning shown also in FIG. 17. Here, L1 and L2 are values previously defined by a design. Specifically, they can be calculated by the equation of $Sp = A \times (L2/L1) \times S1$.

Here, A indicates a conversion coefficient for converting a unit of the number of pixels to an output unit, for example, a millimeter, being the unit of length. When the output unit is the number of pixels, A=1 is established. Alternately, the output value may be expressed, with the scale shown in FIG. 6 as the unit.

By the CPU, the calculated value of the adjustment amount Sp may be transmitted to the external device to which the instruction is given through the communication section 8, or may be displayed on a display section provided in the operation panel not shown.

The operator adjusts the position of the supporting pulley based on the outputted adjustment amount. It is easy to adjust the position of either one of the supporting pulley at the starting side for scanning or the ending side for scanning. However, both of them may be adjusted when there is no sufficient room for the adjustment.

The adjustment may be performed repeatedly. For example, after first adjustment, based on the instruction of the operator, reading operation is performed by the CPU, so that the first scanning unit is moved to the position P1 and is subsequently moved to the position P2. FIG. 21C shows an example of a read result at the position P2 after the first adjustment. The deviation quantities at this time are represented by Sa2, Sb2, and Sc2. The CPU calculates an average S2 of Sa2, Sb2, and Sc2, and outputs a new adjustment amount Sp based on the calculation result.

The worker repeats the above procedure until the outputted adjustment amount becomes smaller than a prescribed value.

Note that the reading position of the image for adjustment is not limited to the positions P1 and P2, but may be at least two points such as the positions in different sub-scanning directions. When the distance L1 between the two points and the distance L2 between the supporting pulleys are known, the adjustment amount Sp of the supporting pulley can be calculated. However, a larger distance L1 has a larger deviation quantity (the number of pixels) to be read, thereby making it possible to perform measurement with a high degree of accuracy. From this viewpoint, it is preferable to perform reading operation in the vicinity of the position P1 and the position P2.

Calculation of the Adjustment Amount of the Supporting Pulley Position—No. 2

Figure 22:
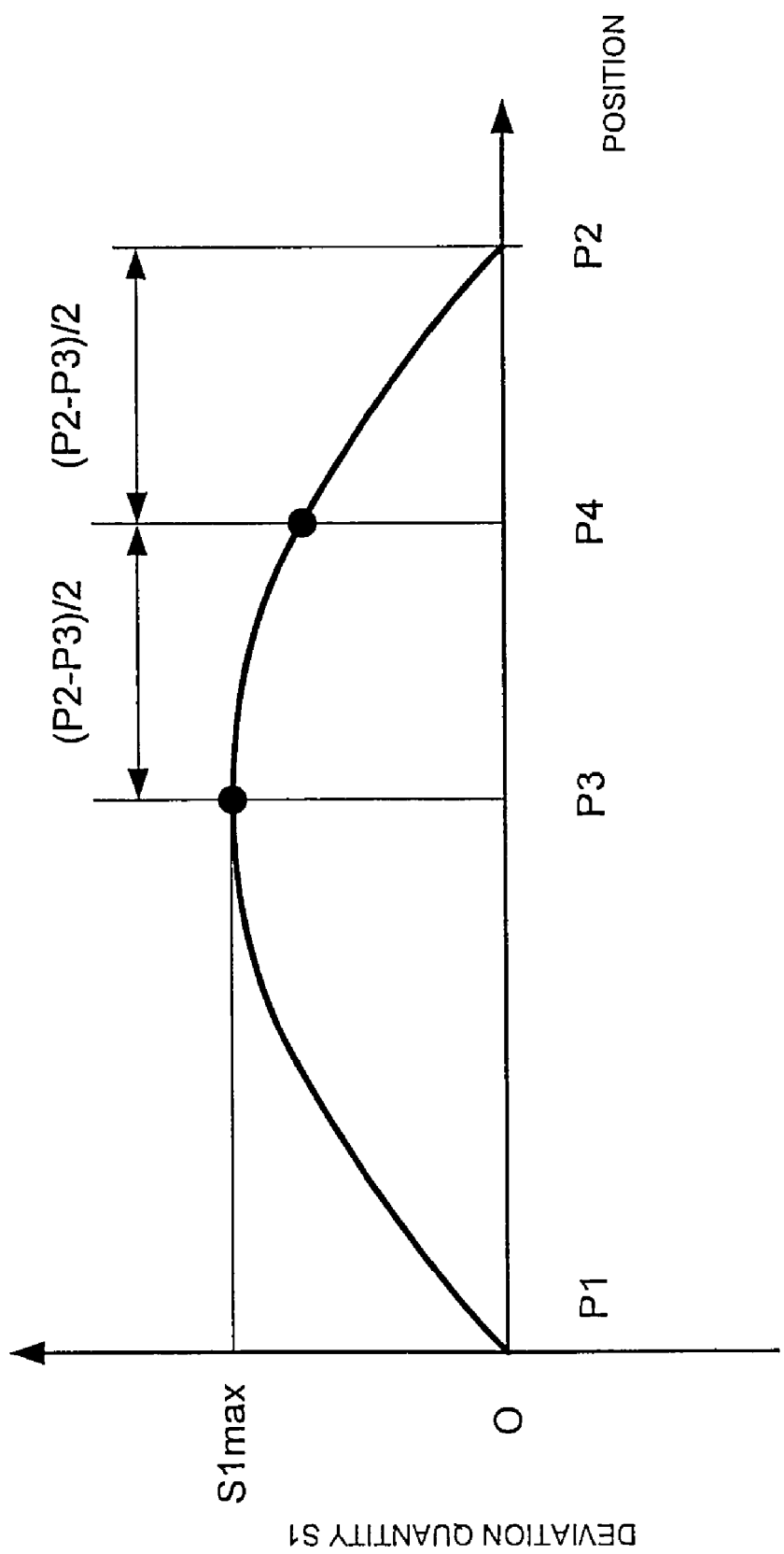
FIG. 22 is a graph showing a result of measuring a deviation quantity at each position, after the deviation quantity is read and adjusted at the positions P1 and P2.

A mode different from the above described adjustment procedure of the supporting pulley will be described. According to the result of measuring the deviation quantity by the document reading apparatus, in some document reading apparatus, the deviation quantity S1 is non-linearly changed according to the position of the first scanning unit. FIG. 22 shows a typical example of such a characteristic. FIG. 22 is a graph showing the result of measuring the deviation quantity S1 at each position in the moving region of the first scanning unit, after the deviation quantity S1 is read at the positions P1 and P2 and adjusted. The deviation quantity S1 is taken on the abscissa axis, the position of the first scanning unit is taken on the ordinate axis, and an upper side is represented by the position P1 and a lower side is represented by the position P2 so as to conform to FIG. 16.

Ideally, the deviation quantity S1 should be zero at each position between the positions (adjustment point) P1 and P2 used for adjusting the deviation quantity S1, because adjustment is performed to bring the deviation quantity S1 zero at the positions P1 and P2. However, as shown in FIG. 22, in some document reading apparatuses, as the adjustment point is separated away from the point P1 or P2, the deviation quantity S1 is increased and becomes a maximum value S1max at a position P3 in the vicinity of the center between them.

Although it is not clear why the deviation quantity S1 exhibits such a characteristic, the following factor is taken into consideration. The reason why the deviation quantity S1 occurs between the adjustment points P1 and P2 is that when the second scanning unit 22 moves in a moving region, the position at the pulley 49a side and the position at the pulley 49b side are deviated in a moving direction or in a vertical direction. Similar deviation is conceivable for the first scanning unit 21. However, it can be so considered that the second scanning unit 22 having two mirrors (second and third mirrors) on the optical path has a larger influence than the first scanning unit 21 having only one mirror (first mirror) on the optical path. FIG. 29 is an explanatory view showing a deviation quantity occurring between the scanning end-edge and the scanning start-edge. As shown in FIG. 29, the position at the pulley 49a side and the position at the pulley 49b side of the second scanning unit 22 are deviated. The reason therefor seems to be a variation of the tension of the driving wires 45a and 45b and a twist of the driving shaft 43, for example. They act in a contrary direction with each other in acceleration and deceleration, and there is a phase of a uniform speed movement in this interval. As other conceivable factor, there are an error of diameters of the driving pulleys 39a and 39b, an error of diameters of the driving wires 45a and 45b, and a difference in the degree of contacting of the driving wire with the driving pulley.

Figure 23:
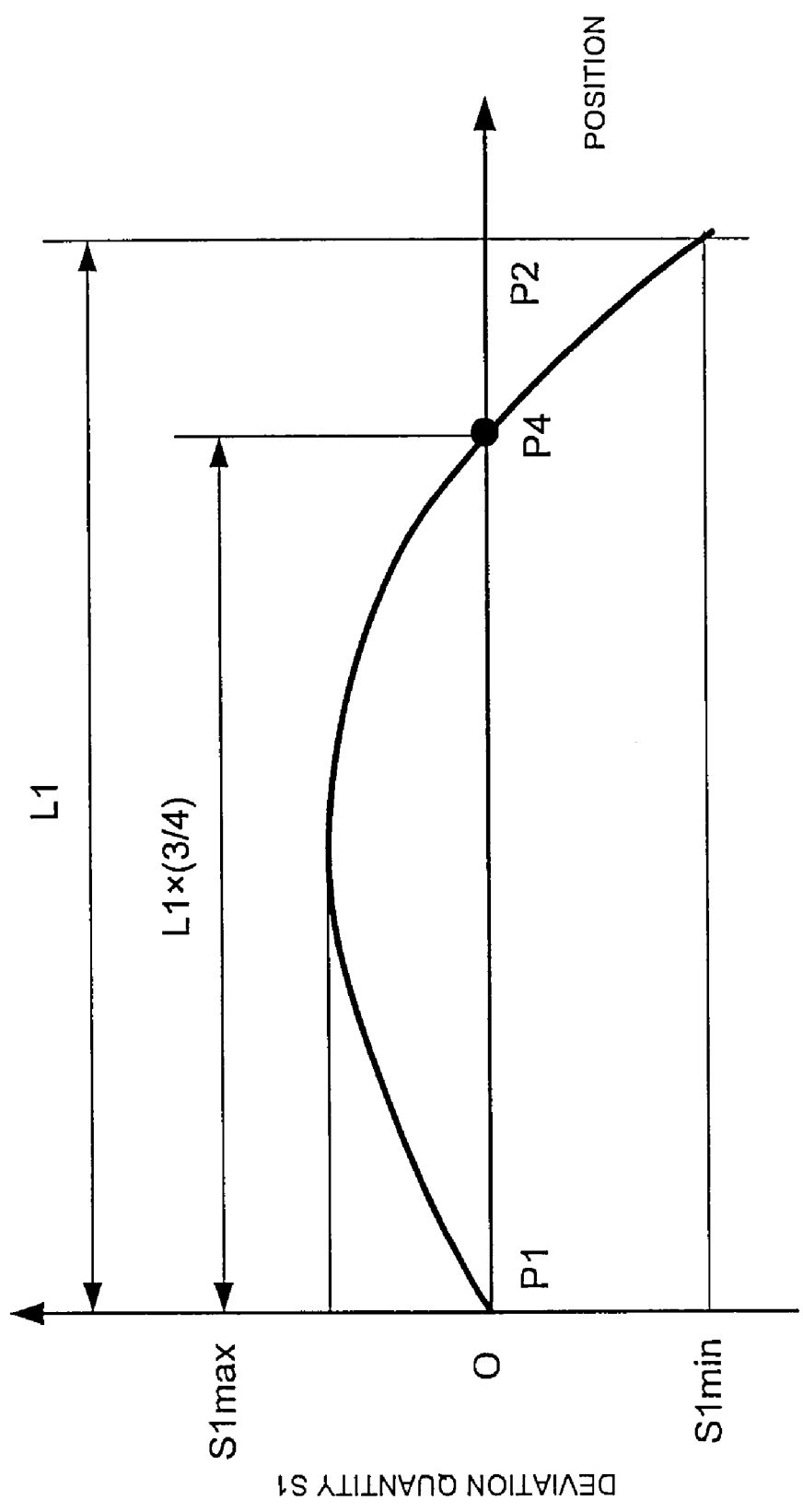
FIG. 23 is a graph showing the deviation quantity at each position, with the position P1 and an intermediate position P4 as adjustment points.

In the document reading apparatus in which such a characteristic appears remarkably, even when the adjustment of the supporting pulley is performed with the positions P1 and P2 as the adjustment point, streaks due to dust adhesion appears in the intermediate region of the positions P1 and P2, and streaks appear remarkably at the peak of the deviation quantity in the vicinity of the center. Therefore, in consideration that the deviation quantity S1 has a curving characteristic with respect to the scanning position, the adjustment point is not set at the two points of the positions P1 and P2, and one of the adjustment points is set at the position close to an intermediate part of the moving region. For example, as shown in FIG. 23, one adjustment point may be set at a position P4 having a distance L1×(¾) from the position P1. Alternately, as shown in FIG. 22, the position P4 may be set at the position of the intermediate part between the position P3 at which the deviation quantity S1 shows a peak, and the position P2.

With the positions P4 and P1 thus determined as the adjustment points, the adjustment of the supporting pulley is performed. Then, as shown in FIG. 23, the deviation quantity is changed from plus to minus across the position P4. In the moving region of the first scanning unit, an absolute value S1max of the deviation quantity is smaller than the case of FIG. 22. In FIG. 23, although the deviation quantity S1 appears in the negative direction in the vicinity of the position P2, the absolute value thereof is smaller than S1max of FIG. 22.

As shown in FIG. 23, when one of the adjustment points is set at the scan starting portion, it may be easy to adjust the position of the supporting pulley at the ending side for scanning. However, this should not be restrictive.

Also, one of the adjustment points may be set at the position P1 of the reference white board 3, and the other adjustment point may be set at the position P4 close to the intermediate part.

As described above, various positions are considered as the adjustment points, and therefore the operator may set the positions of the two adjustment points respectively. The operator gives an instruction to the CPU by using the operation panel not shown, and the CPU determines the adjustment points based on the instruction. In determining the adjustment points, the adjustment is performed with the positions at one end side and at the other end side of the moving region, for example the positions P1 and P2 as the adjustment points, and thereafter the deviation quantity S1 at each position in the moving region is measured, and based on the measurement result, the positions of the two adjustment points may be set respectively.

The Adjustment Procedure of the Supporting Pulley—No. 1

Figure 3:
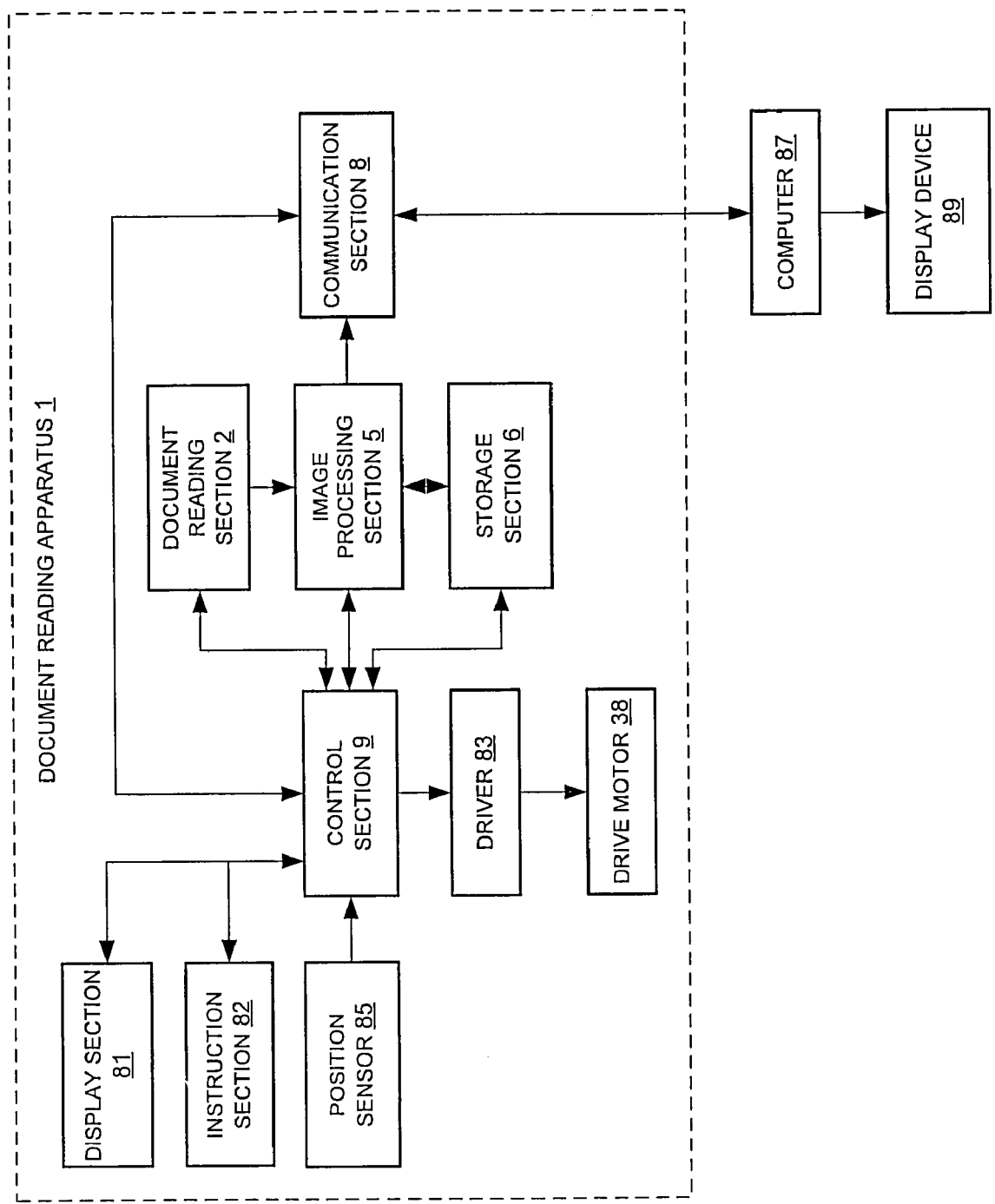
FIG. 3 is a block diagram showing a flow of image information of the document reading apparatus according to the present invention.
Figure 24:
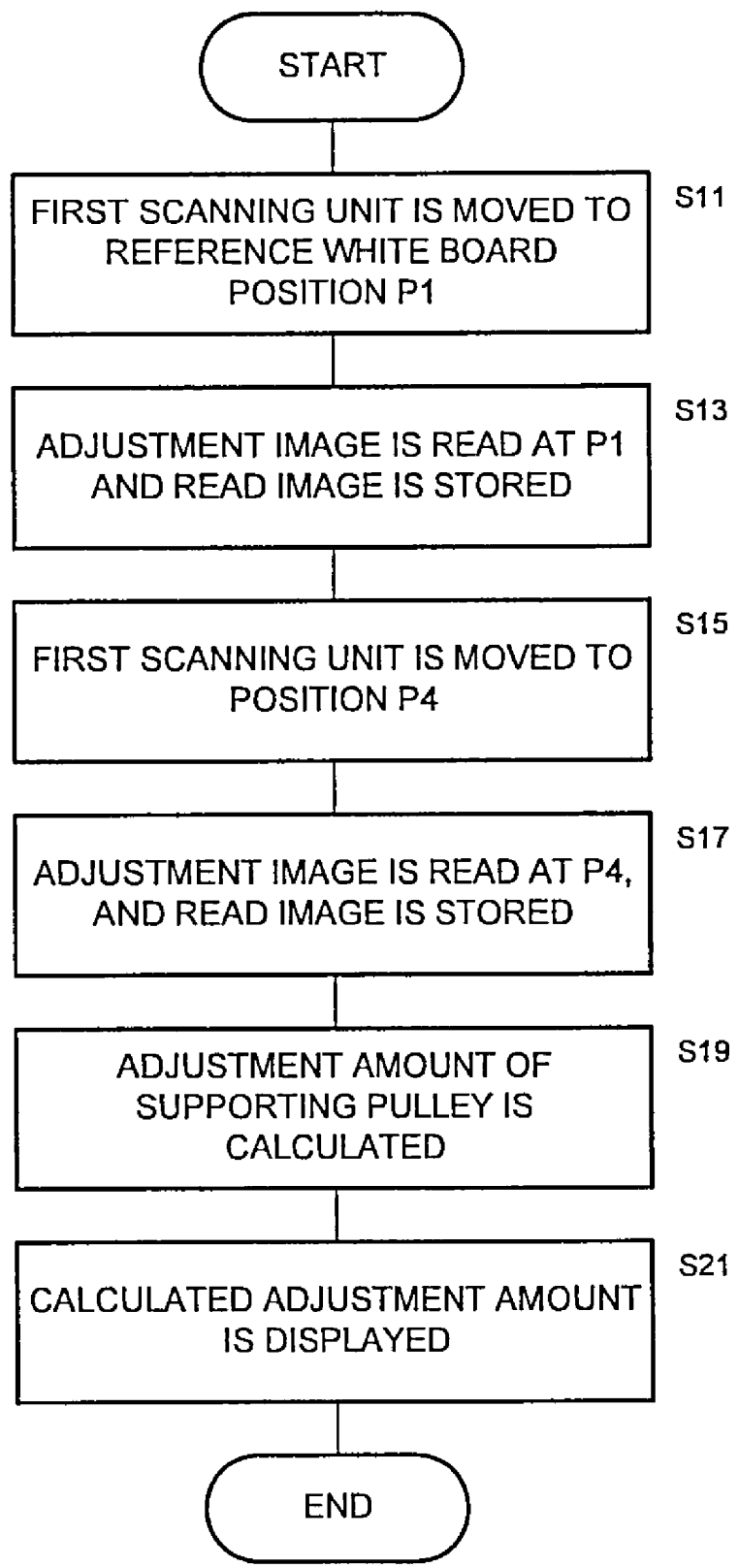
FIG. 24 is a flowchart showing a procedure of calculating an adjustment amount of the supporting pulley according to the present invention.

An example of a procedure of the adjustment is shown hereinafter. FIG. 24 is a flowchart showing the procedure of calculating the adjustment amount of the supporting pulley according to the present invention. A main body executing the flowchart of FIG. 24 is a control section 9 of FIG. 3. FIG. 3 is a block diagram showing a constitution of the document reading apparatus according to the present invention, and details therefor will be described later. Preferably, the function of the control section 9 is realized by executing the program for adjustment by the CPU.

As shown in FIG. 24, by the control section 9, first, the first scanning unit 21 is moved to the position P1 (step S11). As shown in FIG. 2, the position P1 is the position where the reference white board 3 exists. At this position, the image for adjustment is read and the read result is stored (step S13). Next, by the control section 9, the first scanning unit 21 is moved to the position P4 (step S15). The position P4 is the position closer to the center than the scanning end-edge position P2, and for example, is the position at a distance L1×(¾) from P1. At this position, the image for adjustment is read and the read result is stored (step S17).

Based on the result of reading the image for adjustment at the positions P1 and P4, the control section 9 calculates the adjustment amount of the supporting pulley (step S19). Then, the calculated adjustment amount is displayed on a display section 81 as will be described later (step S21).

Based on the displayed adjustment amount, the adjustment of the supporting pulley is performed by the operator.

The Adjustment Procedure of the Supporting Pulley—No. 2

Figure 25:
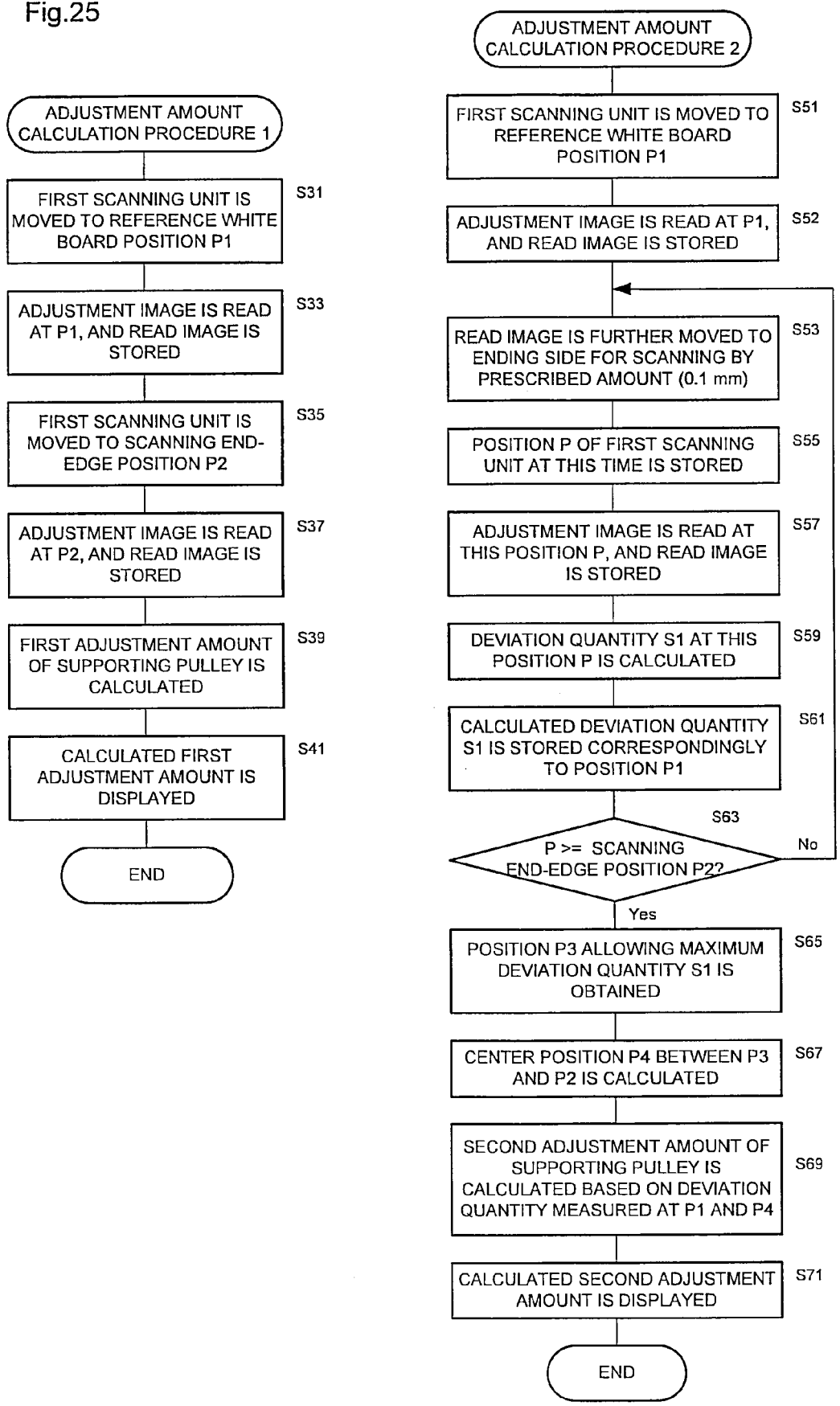
FIG. 25 is a flowchart showing a different procedure for calculating the adjustment amount of the supporting pulley according to the present invention.

The procedure different from the above described adjustment procedure is shown below. FIG. 25 is a flowchart showing the procedure different from FIG. 24, for calculating the adjustment amount of the supporting pulley according to the present invention. As shown in FIG. 25, the procedure of calculating the adjustment amount is divided into two. In procedure 1, the control section 9 calculates a first adjustment amount with the positions P1 and P2 as the adjustment points. Based on the displayed adjustment amount, first adjustment of the supporting pulley is performed by the operator. After the first adjustment, the control section 9 calculates a second adjustment amount, with the positions P1 and P4 as the adjustment points. Here, in order to determine the position P4, the control section 9 sequentially moves in the moving region from P1 to P2 by a unit of a specified quantity, calculates the deviation quantity S1 at each position, and determines a center position between the position where the deviation quantity S1 becomes maximum and the position P2, as the position P4.

Specific procedure will be described. First, the procedure 1 will be described. In the procedure 1, by the control section 9, the first scanning unit 21 is moved to the position P1 (step S31). Then, by the control section 9, the image for adjustment is read at the position P1 and the read result is stored (step S33). Next, by the control section 9, the first scanning unit 21 is moved to the position P2 (step S35). The position P2 is a scanning end-edge position. At this position, the image for adjustment is read and the read result is stored (step S37).

The control section 9 calculates the adjustment amount of the supporting pulley, based on the result of reading the image for adjustment at the positions P1 and P2 (step S39). Then, the calculated adjustment amount is displayed on the display section 81 as will be described later (step S41). Based on the displayed adjustment amount, the first adjustment of the supporting pulley is performed by the operator.

Next, procedure 2 will be described. After the first adjustment, the control section 9 executes the procedure 2 in accordance with the instruction of the operator. In the procedure 2, first, the control section 9 moves the first scanning unit 21 to the position P1 (step S51). At the position P1, the image for adjustment is read and the read result is stored (step S52). Next, by the control section 9, the first scanning unit 21 is moved to the ending side for scanning by a specified quantity (step S53). Here, as an example, the specified quantity is 10 mm. The control section stores this position P (step S55). Information on the position is acquired by the control section 9 from a position sensor 85 as will be described later. The control section 9 reads the image for adjustment at this position P, and stores the read result (step S57). Then, the control section 9 calculates the deviation quantity S1 at the position P, based on the read result at the position P and the read result at the position P1 (step S59). Then, the calculated deviation quantity S1 is stored so as to correspond to the position P (step S61).

Subsequently, the control section 9 determines whether or not the position P is equal to the scanning end-edge position P2, or exceeds the position P2 (step S63). When the position P does not reach the position P2, the routine is advanced to the step S53, and each step of the steps S53 to S61 is executed. Thus, the deviation quantity S1 at each position from the positions P1 to P2 is stored.

When it is so determined that the first scanning unit 21 reaches P2 (Yes in step S63), the control section 9 obtains the position P3 where the maximum deviation quantity Smax of the deviation quantity S1 at each position is obtained (step S65). Then, the center position between the positions P3 and P2 is obtained as P4 (step S67). Then, based on the read result of the image for adjustment read at the obtained positions P4 and P1, the adjustment amount of the supporting pulley is calculated (step S69). Then, the calculated adjustment amount is displayed on the display section 81 as will be described later (step S71). Based on the displayed adjustment amount, the second adjustment of the supporting pulley is performed by the operator. Thus, the adjustment is completed.

Figure 26:
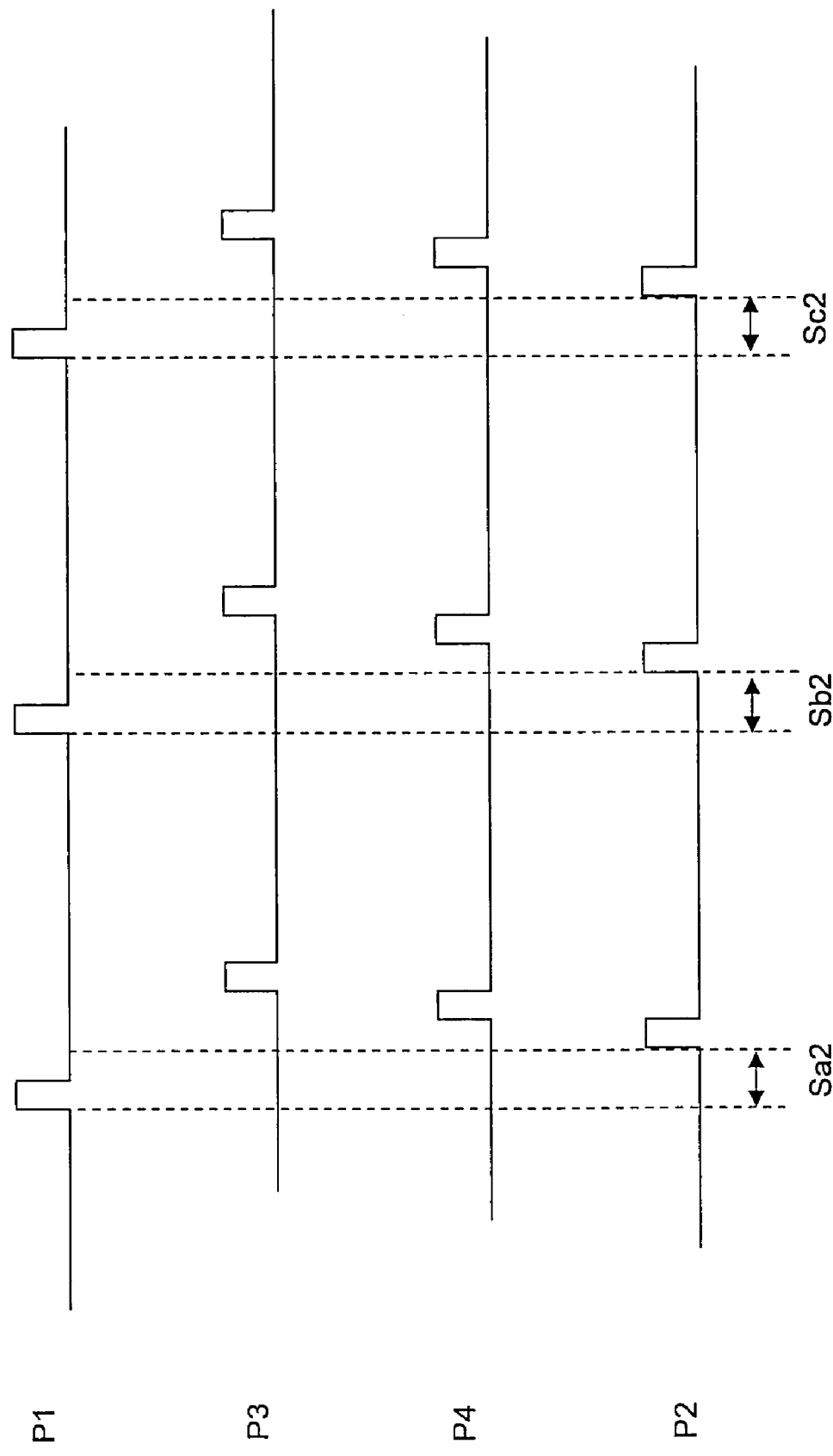
FIG. 26 is a graph showing the signal of the adjustment image read at positions P1, P3, P4, and P2, respectively.
Figure 27:
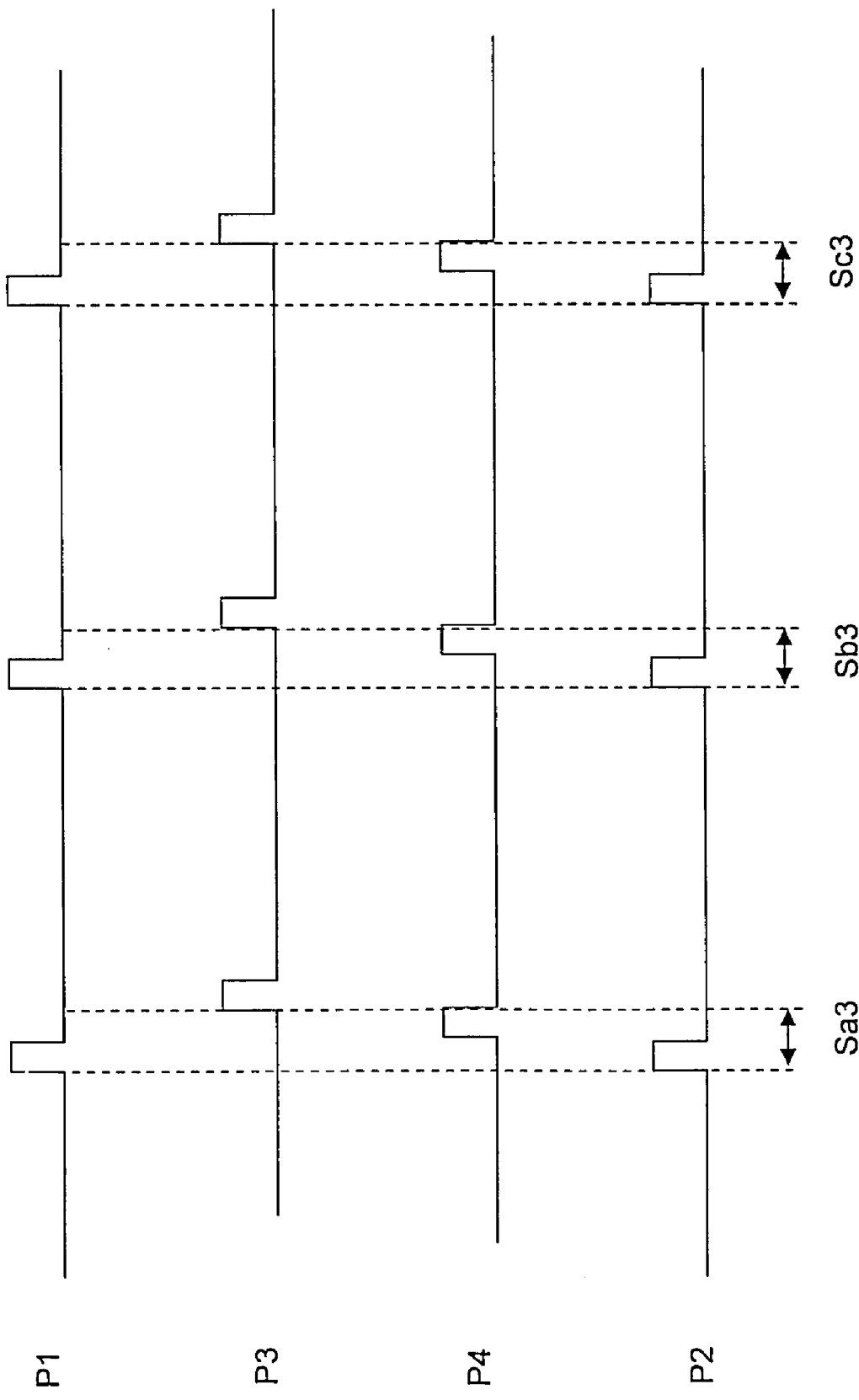
FIG. 27 is a graph showing the signal of the adjustment image read at the positions P1, P3, P4, and P2, respectively in a state after executing an adjustment procedure 1.
Figure 28:
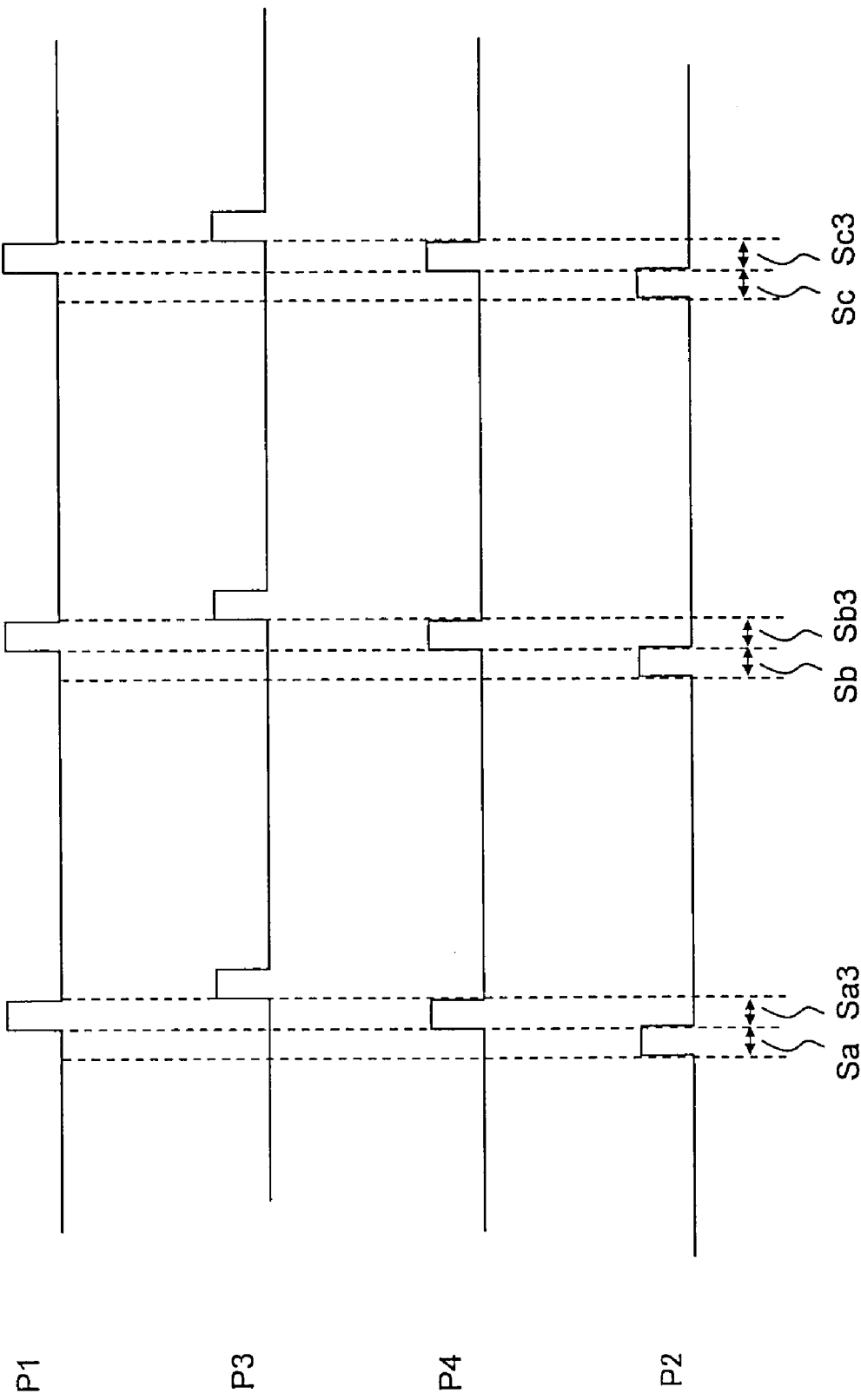
FIG. 28 is a graph showing the signal of the adjustment image read at the positions P1, P3, P4, and P2 in a state after executing an adjustment procedure 2.

FIGS. 26 to 28 are graphs showing a signal of the adjustment image read at the positions P1, P3, P4, and P2, respectively before and after the adjustment. FIG. 26 shows a state before the adjustment. FIG. 27 shows a state after the adjustment in the procedure 1, with P1 and P2 as the adjustment points. Although there is no deviation in the read results at the positions P1 and P2, the deviation appears at P3 and P4. Deviation quantities Sa3, Sb3, and Sc3 at P3 are given as maximum deviation quantities, respectively. FIG. 28 shows the state after the adjustment of procedure 2. In FIG. 28, although no deviation appears in the read results at P1 and P4, Sa3, Sb3, and Sc3 are given as the deviation quantities at P3, respectively, and Sa2, Sb2, and Sc2 are given as the deviation quantities at P2. However, either deviation quantity at P2 or P3 is smaller than the deviation quantity at P3 of FIG. 27.

Note that in the above description, description is given on a mode in which the control section 9 of the document reading apparatus calculates the adjustment amount. However, the calculation of the adjustment amount may be performed by equipment for adjustment connected to the outside of the document reading apparatus, such as a personal computer having an adjustment program installed therein.

An Overall Structure of the Document Reading Apparatus

An overall structure of the document reading apparatus will be described hereinafter.

FIG. 2 is an explanatory view schematically showing a mechanical structure of the document reading apparatus according to the present invention.

FIG. 3 is a block diagram showing a flow of image information of the document reading apparatus according to the present invention. A mechanical part of the document reading apparatus as shown in FIG. 2 is included in the document reading section 2 of FIG. 3.

As shown in FIG. 3, the document reading apparatus 1 includes a document reading section 2, an image processing section 5, a storage section 6, and the communication section 8. The document reading section 2 irradiates the document with light, guides the light reflected from the document to the imaging optical system, and reads the document by the imaging sensor 14. An image signal of the document read by the imaging sensor 14 is outputted to an image processing section 5. By the image processing section 5, the image signal from the imaging sensor 14 is A/D converted and is converted into image data, and color conversion processing and image processing such as filter processing are performed on the converted image data. Also, the shading correction is executed in cooperation with the document reading section 2. When the image processing section 5 performs the image processing on the image data, the storage section 6 temporarily stores the image data of a processing object. In addition, the storage section 6 holds the processed image data until the image data is transferred to an external device through the communication section 8. The communication section 8 receives the image data from the storage section 6 through the image processing section 5, and transfers it to the external device. In FIG. 3, as the external device, a computer 87 is connected. The computer 87 has a display device 89.

The image processing section 5 and the communication section 8 are, for example, constituted by a CPU, a ROM for storing a program executed by the CPU, a RAM for providing a storage region for work, a nonvolatile memory for storing a set value of each block that performs image processing, and an LSI having a structure in which a circuit block for image processing and communication is integrated. The storage section 6 is also constituted by a DRAM and a memory element of other system. Further, a storage device such as an HDD can also be applied to the storage section 6. Moreover, the CPU also functions as the control section 9 of the document reading section 2, and controls the operation of the image reading section.

Further, the image reading apparatus includes a display section 81, an instruction section 82, a driver 83, and a position sensor 85, and they are connected to the control section 9. The control section 9 can display the information on the display section 81 as needed. The display section 81 and the instruction section 82 are located on the operation panel not shown. A dot matrix liquid crystal display device is given as a specific example of the display section 82. A touch panel provided on the liquid crystal display device or a key disposed in the vicinity of the display section 81 is given as a specific example of the instruction section 82. The operator can recognize the information displayed on the display section 81. In addition, the operator can input the instruction for the control section 9 by using the instruction section 82.

Moreover, the control section 9 outputs a control signal to the driver 83 for outputting a drive signal of the drive motor 38. Thus, the rotation of the drive motor 38 can be controlled. Namely, driving of the first scanning unit 21 can be controlled. Also, the control section 9 obtains the signal from the position sensor 85 and can know the position and the moving speed of the first scanning unit 21. A rotary encoder attached to the output shaft of the drive motor 38, and a photo-interrupter disposed in the vicinity of the reference white board 3 and detecting the reference position of the first scanning unit 21 are given as specific examples of the position sensor.

The document reading apparatus 2 as shown in FIG. 2 includes the original platen 12 having the original platen surface 11, the light source 13 for irradiating the document placed on the original platen surface 11, the imaging sensor 14 for receiving the light from the document irradiated by the light source 13, and the imaging optical system 15 for focusing the light from the document on the imaging sensor 14. The original platen 12 is made of transparent glass, and is formed into a rectangular shape. The original platen surface 11 is an upper side surface in a thickness direction of the original platen 12. The document, being a reading object, is placed on the original platen surface 11 by a user of the document reading apparatus. A reflection plate 13a for converging the light from the light source on the original platen surface 11 is provided around the light source 13. The light source 13, the imaging sensor 14, and the imaging optical system 15 are disposed at the opposite side of the original platen surface 11, with respect to the original platen 12. For example, a charge coupled device (abbreviated as CCD) is used as the imaging sensor 14.

The imaging optical system 15 has the focusing lens 16, and a mirror group 17 for guiding the light from the document to the focusing lens 16. The focusing lens is formed by fixing a plurality of lenses to an approximately cylindrical frame member, and a resin containing aluminum or glass is used for the frame member. The mirror group 17 is composed of the first mirror 17a, the second mirror 17b, and the third mirror 17c. The light emitted from the light source 13 is reflected diffusely on the surface of the document placed on the original platen surface 11. The light reflected downward from the surface of the document is reflected by the first mirror 17a, and thereafter is sequentially reflected by the second mirror 17b and the third mirror 17c, and is guided to the focusing lens 16. The first mirror 17a is mounted on the first scanning unit 21 together with the light source 13. The second and third mirrors 17b and 17c are mounted on the second scanning unit 22.

The first scanning unit 21 is driven by a driving system composed of a drive motor, pulley, and wire (not shown), and is moved in a direction shown by the arrow A1 (reading direction) at a constant speed V. The reading direction A1 and a direction A2 opposite from this reading direction A1 are collectively referred to as a sub-scanning direction A. The second scanning unit 22 is driven by the driving system, and is moved in the reading direction A1 at a speed of ½ (V/2) of the speed V of the first scanning unit 21. In association with the movement of the first scanning unit 21 and the second scanning unit 22, the mirror group 17 is moved along the original platen 12. The position of the document (reading position) for focusing on the imaging sensor 14 moves to an end position P2 at the ending side for scanning of the original platen surface 11, from an end position P1 at the starting side for scanning of the original platen surface 11. During movement of the first scanning unit 21 and the second scanning unit 22, a speed ratio of both units is maintained to 2:1. Therefore, the optical path length from the document surface to the focusing lens 16 is maintained constant. Thus, the image of the document on the original platen surface 11 is focused on the imaging sensor 14 at each reading position from the position P1 to the position P2.

Preferably, the position P1 is the position provided with the reference white board 3 for shading correction. The first scanning unit 21 moves beneath the reference white board 3, thus making it possible to focus the image of the reference white board 3 on the imaging sensor 14. In order to detect the position, being a reference of the first scanning unit 21, the position sensor not shown is provided. The position sensor is, for example, a photo-interrupter, and detects the signal at a position where a light shielding plate provided in the first scanning unit 21 passes through a slit portion of the photo-interrupter. The CPU controls the rotation of the drive motor 38 as will be described later according to the detection signal, and drives the first scanning unit 21 and the second scanning unit 22.

Figure 2A:
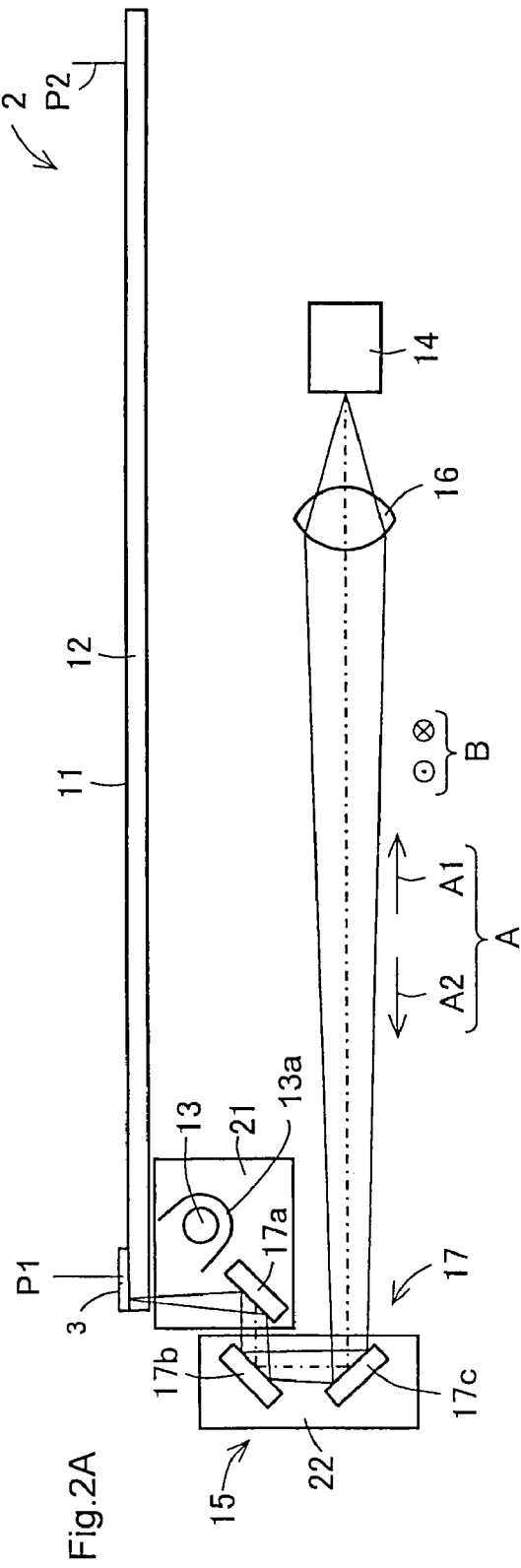
FIG. 2 is an explanatory view schematically showing a mechanical constitution of the document reading apparatus according to the present invention.
Figure 2B:
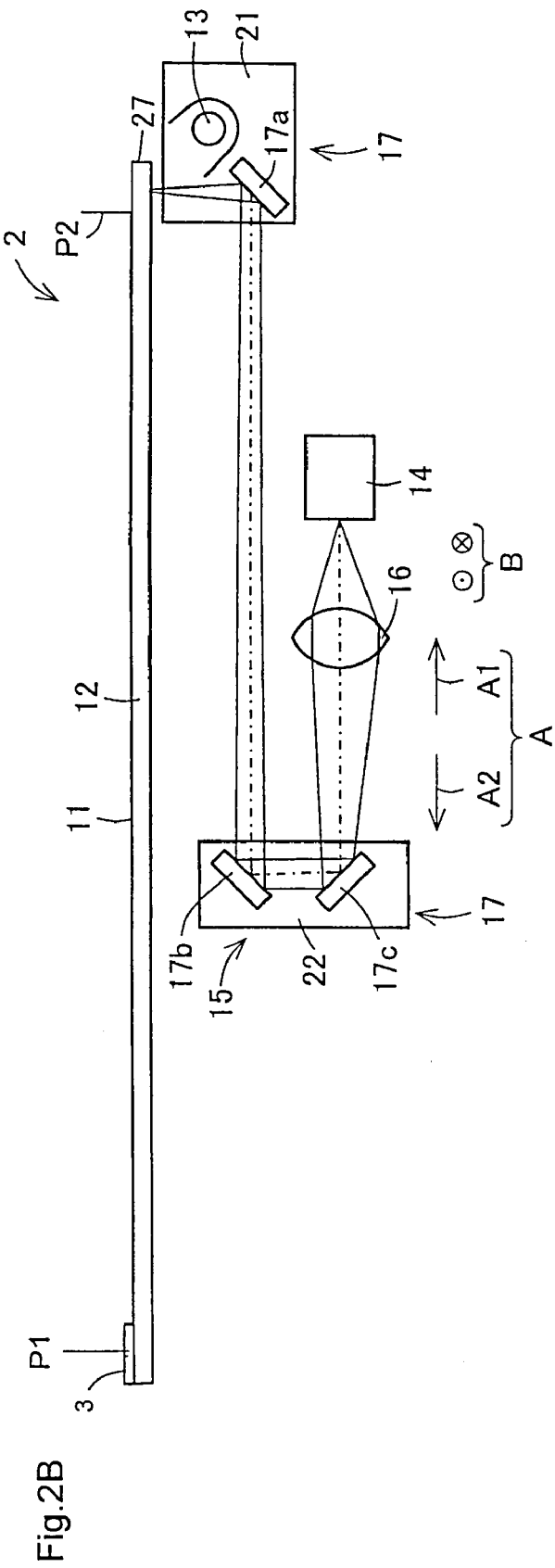

FIG. 2A shows a state in which the first scanning unit 21 is located at a scanning start position outside the position P1, and FIG. 2B shows a state in which the first scanning unit 21 is located at a scanning end position outside the position P2.

Note that in FIG. 2, the direction (the direction vertical to a paper face shown by B indicates the main-scanning direction. The main-scanning direction B is orthogonal to the sub-scanning direction A, in a state where the position adjustment of the supporting pulley according to the present invention is performed.

Finally, it is apparent that there are various modified examples regarding the present invention, other than the aforementioned embodiments. Such modified examples should not be interpreted as not belonging to the characteristics and scope of the present invention. It is intended that the scope of the present invention includes all modifications within a meaning and the scope equivalent to the scope of claims.

What is claimed is:

1. A document reading apparatus comprising:
    a first scanning section that moves in a scanning direction along a document surface, for supporting a first mirror to reflect an image of a document in a direction parallel to the scanning direction;
    an intermediate scanning section that moves synchronous with the first scanning section, for supporting an intermediate mirror to reflect the image of the document reflected by the first mirror in a direction opposite from an incident direction of the image;
    a reading section including an imaging sensor for reading the image of a scanned document and a focusing lens for focusing the image of the document reflected by the intermediate mirror on the imaging sensor;
    a driving wire for pulling the first scanning section in the scanning direction;
    a supporting pulley for supporting the driving wire at a starting side for scanning or at an ending side for scanning;
    a position adjustment section capable of adjusting a position of the supporting pulley in its axial direction;
    a control section for performing such control that the image for adjustment is read by the reading section when the first scanning section is located at a first position and at a second position in the scanning direction, and an adjustment amount of the position adjustment section is calculated based on a readout result of the image; and
    an output section for outputting the calculated adjustment amount.

2. The document reading apparatus according to claim 1, wherein the control section obtains a deviation quantity in an axial direction of the supporting pulley of the image for adjustment read at the first position and the second position, and calculates such an adjustment amount that the deviation quantity is minimized.

3. The document reading apparatus according to claim 1, wherein the position adjustment section functions to adjust a position such that at least the moving direction of the first scanning section is coincident with an optical axis direction of the focusing lens.

4. The document reading apparatus according to claim 1, wherein the position adjustment section includes a rotatable shaft member and a conversion mechanism for converting rotation of the shaft member to linear movement in an axial direction of the supporting pulley.

5. The document reading apparatus according to claim 1, further comprising:
    a driving pulley on which the driving wire is wound and hung, wherein the first scanning section is pulled via the driving wire in association with turning of the driving pulley, and the supporting pulley supports the driving wire on a route of the driving wire from the driving pulley to the first scanning section.

6. The document reading apparatus according to claim 1, wherein the deviation quantity includes deviation that occurs when a direction of a center of the image guided to the focusing lens by the first mirror or intermediate mirror obliquely intersects with the optical axis of the focusing lens.

7. The document reading apparatus according to claim 1, wherein the image for adjustment is placed on the first mirror.

8. The document reading apparatus according to claim 1, wherein the image for adjustment is placed on the first scanning section, and is supported at a height approximately equal to the document surface.

9. The document reading apparatus according to claim 1, wherein the first position is located at a scan starting portion of a scanning region where the first scanning section moves for reading the document.

10. The document reading apparatus according to claim 1, wherein the first position is located at a scan starting portion of an original platen surface on which the document is placed.

11. The document reading apparatus according to claim 1, wherein the first position is a position where a reference reading region for adjustment is arranged.

12. The document reading apparatus according to claim 1, wherein the second position is located at a scan ending portion of a scanning region where the first scanning section moves for reading the document.

13. The document reading apparatus according to claim 1, wherein the second position is located in a scanning scan ending portion of an original platen surface on which the document is placed.

14. The document reading apparatus according to claim 1, wherein the second position is a scanning end-edge position for the document of a maximum length.

15. The document reading apparatus according to claim 1, wherein the second position is located in a region sandwiched between a third position at an equal distance from both of the scan starting portion and the scan ending portion of a moving region of the first scanning section, and a scan ending portion.

16. The document reading apparatus according to claim 1, wherein the second position is located in a center portion between a third position and a scan ending portion.

17. A method of calculating a position adjustment amount of a position adjustment part in a document reading apparatus comprising:

a first scanning section that moves in a scanning direction along a document surface, for supporting a first mirror to reflect an image of a document in a direction parallel to a scanning direction;

an intermediate scanning section that moves synchronous with the first scanning section, for supporting an intermediate mirror to reflect the image of the document reflected by the first mirror in a direction opposite from an incident direction of the image;

a reading section including an imaging sensor for reading the image of a scanned document and a focusing lens for focusing the image of the document reflected by the intermediate mirror on the imaging sensor;

a driving wire for pulling the first scanning section in the scanning direction;

a supporting pulley for supporting the driving wire at a starting side for scanning or at an ending side for scanning; and a position adjustment section capable of adjusting a position of the supporting pulley in its axial direction, the method comprising the steps of:

moving the first scanning section to a first position and reading an image for adjustment by the reading section;

moving the first scanning section to a second position from the first position and reading the image by the reading section; and calculating the adjustment amount of the position adjustment section based on a readout result of an image for adjustment read at the first position and the second position, wherein each step is executed by a computer.

18. The method of calculation according to claim 17, wherein the calculating step is the step of obtaining a deviation quantity of the image for adjustment read at the first position and the second position in an axial direction of the supporting pulley, and calculating such an adjustment amount that the deviation quantity is minimized.

19. The method of calculation according to claim 17, further comprising the steps of:

calculating a temporary deviation quantity, with a scan starting portion or a scan ending portion of a moving region set as the first position, and each position in the moving region set as a temporary second position; and determining an intermediate position between a position of allowing a maximum deviation quantity to occur out of the calculated temporary deviation quantity and the scan ending portion, as a final second position.

* * * * *